US012737119B2

(12) United States Patent
Yang et al.

(10) Patent No.: US 12,737,119 B2
(45) Date of Patent: Sep. 15, 2026

(54) MEMORY DEVICE WITH ALTERNATE BIT LINE SENSING

(71) Applicant: Sandisk Technologies, Inc., Milpitas, CA (US)

(72) Inventors: Xiang Yang, Santa Clara, CA (US); Deepanshu Dutta, Fremont, CA (US); Masaaki Higashitani, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 64 days.

(21) Appl. No.: 18/679,415

(22) Filed: May 30, 2024

(65) Prior Publication Data

US 2025/0370623 A1 Dec. 4, 2025

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
USPC .................................................... 365/185.33
See application file for complete search history.

(56) References Cited

U.S. PATENT DOCUMENTS 5,010,524 A * 4/1991 Fifield ...................... G11C 7/18 365/205
6,304,479 B1 * 10/2001 Vollrath ................. G11C 5/063 365/206
2016/0284717 A1 * 9/2016 Wolstenholme ....... H10B 41/10
2021/0319833 A1 * 10/2021 Yabe .................. G11C 16/0483

* cited by examiner

*Primary Examiner* — Alexander Sofocleous
*Assistant Examiner* — Duy H Luong
(74) *Attorney, Agent, or Firm* — Dickinson Wright PLLC

(57) ABSTRACT

The memory device includes a memory block with an array of memory cells. The memory cells are arranged in a plurality of word lines and in a plurality of memory holes. The plurality of memory holes are in electrical communication with respective bit lines of a plurality of bit lines. The plurality of bit lines includes a plurality of active bit lines and a plurality of inactive bit lines. The active bit lines are in electrical communication with active sense amplifiers and memory cells during read operations, and the inactive bit lines are not in electrical communication with active sense amplifiers or memory cells during the read operations.

30 Claims, 24 Drawing Sheets

MEMORY DEVICE WITH ALTERNATE BIT LINE SENSING

BACKGROUND

1. Field

The present disclosure is related generally to non-volatile memory and, more particularly, to read techniques for non-volatile memory to improve performance.

2. Related Art

Semiconductor memory is widely used in various electronic devices such as cellular telephones, digital cameras, personal digital assistants, medical electronics, mobile computing devices, servers, solid state drives, non-mobile computing devices and other devices. Semiconductor memory may be non-volatile memory or volatile memory. A non-volatile memory allows information to be stored and retained even when the non-volatile memory is not connected to a source of power (e.g., a battery).

Non-volatile memory devices include one or more memory chips having multiple arrays of memory cells. The memory arrays may have associated decoders and circuits for performing read, write, and erase operations. Memory cells within the arrays may be arranged in horizontal rows and vertical columns. Each row may be addressed by a word line, and each column may be addressed by a bit line. Data may be loaded into columns of the array using a series of data busses. Each column may hold a predefined unit of data, for instance, a word encompassing two bytes of information.

In some applications, semiconductor memory is used to store very large amounts of data that are repeatedly accessed (e.g., read) very rapidly. For example, in some machine learning applications, large language models that include a terabyte (or more) of data must be stored in memory and retrieved at a very high data rate. Accordingly, such applications require very high bandwidth and low power.

Currently, high bandwidth volatile memory devices (e.g., DRAM memory devices called "high bandwidth memory" or "HBM") are used for such applications. Non-volatile memory (e.g., NAND) is significantly less expensive than DRAM, but the bandwidth of conventional NAND memory devices is too low, and the power consumption of conventional NAND memory devices is too high to provide a viable alternative to HBM devices. Therefore, there is a need to provide high bandwidth, low power non-volatile memory.

SUMMARY

One aspect of the present disclosure is related to a memory device that includes a memory block with an array of memory cells. The memory cells are arranged in a plurality of word lines and in a plurality of memory holes. The plurality of memory holes are in electrical communication with respective bit lines of a plurality of bit lines. The plurality of bit lines includes a plurality of active bit lines and a plurality of inactive bit lines. The active bit lines are in electrical communication with active sense amplifiers and memory cells during read operations, and the inactive bit lines are not in electrical communication with active sense amplifiers or memory cells during the read operations.

According to another aspect of the present disclosure, the bit lines of the set of bit lines extend at least partially in parallel relationship with one another, and the active bit lines and inactive bit lines are arranged in alternating fashion.

According to yet another aspect of the present disclosure, the inactive bit lines of the set of bit lines are electrically connected to a shared voltage source that holds the inactive bit lines at a constant voltage during the read operations.

According to still another aspect of the present disclosure, the memory block is a first memory block in a plane that includes a plurality of memory blocks that are in electrical communication with the set of bit lines. The plurality of memory blocks further includes a second memory block.

According to a further aspect of the present disclosure, the memory device further includes circuitry that is in communication with the plurality of memory blocks. The circuitry is configured to perform a first read operation on the first memory block while the active bit lines of the set of bit lines are held at a first voltage that is greater than zero Volts. Without ramping the active bit lines of the set of bit lines down from the first voltage, the circuitry is configured to perform a second read operation on a second memory block of the plurality of memory blocks while the active bit lines of the set of bit lines are held at the first voltage.

According to yet a further aspect of the present disclosure, during and between the first and second read operations, the circuitry is configured to prevent the set of bit lines from falling by more than 25% from the first voltage.

According to still a further aspect of the present disclosure, during and between the first and second read operations, the inactive bit lines are electrically connected to a shared voltage source that holds the inactive bit lines at a second voltage.

According to another aspect of the present disclosure, during and between the first and second read operations, the inactive bit lines are electrically floating.

According to yet another aspect of the present disclosure, at least half of the plurality of bit lines are inactive bit lines.

According to still another aspect of the present disclosure, at least half of the memory holes of the plurality of memory holes are inactive memory holes with memory cells that do not contain data.

Another aspect of the present disclosure is related to a memory device that includes a memory block with an array of memory cells. The memory cells are arranged in a plurality of word lines and in a plurality of memory holes. The plurality of memory holes are in electrical communication with respective bit lines of a set of bit lines. The set of bit lines includes a plurality of active bit lines that are in electrical communication with active sense amplifiers and memory cells during read operations. The bit lines of the set of bit lines extend at least partially in parallel relationship with one another. Adjacent ones of the plurality of active bit lines are spaced apart from one another by at least 30 nm.

According to another aspect of the present disclosure, the set of bit lines further includes a plurality of inactive bit lines that are not in electrical communication with active sense amplifiers or memory cells during read operations. At least one of the inactive bit lines is disposed between each pair of adjacent active bit lines.

According to yet another aspect of the present disclosure, the memory block is a first memory block in a plane that includes a plurality of memory blocks that are in electrical communication with the set of bit lines. The plurality of memory blocks further includes a second memory block.

According to still another aspect of the present disclosure, the memory device further includes circuitry that is in communication with the plurality of memory blocks. The circuitry is configured to perform a first read operation on the first memory block while the active bit lines of the set of bit lines are held at a first voltage that is greater than zero Volts. Without ramping the active bit lines of the set of bit lines down from the first voltage, the circuitry is configured to perform a second read operation on a second memory block of the plurality of memory blocks while the active bit lines of the set of bit lines are held at the first voltage.

According to a further aspect of the present disclosure, during and between the first and second read operations, the circuitry is configured to prevent the set of bit lines from falling by more than 25% from the first voltage.

According to yet a further aspect of the present disclosure, at least half of the memory holes of the plurality of memory holes are inactive memory holes that do not contain data.

Yet another aspect of the present disclosure is related to a computing system that includes a processor unit. The computing system also includes a plurality of high bandwidth flash units. At least one of the high bandwidth flash units includes a plurality of planes. At least one of the planes has a plurality of memory blocks that are in electrical communication with a set of bit lines. The memory blocks each include an array of memory cells that are arranged in a plurality of word lines and a plurality of memory holes. The computing system also includes a set of bit lines. The set of bit lines includes a plurality of active bit lines that are in electrical communication with active sense amplifiers and memory cells during sensing operations. The set of bit lines also includes a plurality of inactive bit lines that are not in electrical communication with active sense amplifiers or memory cells during read operations.

According to another aspect of the present disclosure, the bit lines of the set of bit lines extend at least partially in parallel relationship with one another, and the active bit lines and inactive bit lines are arranged in alternating fashion.

According to yet another aspect of the present disclosure, the inactive bit lines of the set of bit lines are electrically connected to a shared voltage source that holds the inactive bit lines at a second voltage during the read operations.

According to still another aspect of the present disclosure, the plurality of memory blocks includes a first memory block and a second memory block. The computing system further includes circuitry that is in communication with the plurality of memory blocks. The circuitry is configured to perform a first read operation on the first memory block while the active bit lines of the set of bit lines are held at a first voltage that is greater than zero Volts. Without ramping the active bit lines of the set of bit lines down from the first voltage, the circuitry is configured to perform a second read operation on a second memory block of the plurality of memory blocks while the active bit lines of the set of bit lines are held at the first voltage.

According to another aspect of the present disclosure, during and between the first and second read operations, the circuitry is configured to prevent the plurality of active bit lines from falling by more than 25% from the first voltage.

According to yet another aspect of the present disclosure, at least half of the bit lines in the set of bit lines are inactive bit lines.

Still another aspect of the present disclosure is related to a method of performing a sensing operation in a memory device. The method includes the step of preparing a memory block that has an array of memory cells arranged in a plurality of word lines and in a plurality of memory holes. The plurality of memory holes are in electrical communication with respective bit lines of a set of bit lines. The method further includes the step of performing a read operation on a selected word line of the plurality of word lines using only a plurality of active bit lines of the set of bit lines while a plurality of inactive bit lines of the set of bit lines remain inactive.

According to another aspect of the present disclosure, the read operation includes discharging a plurality of sense nodes through the plurality of active bit lines and through a plurality of active memory holes of the plurality of memory holes while the plurality of inactive bit lines of the set of bit lines and a plurality of inactive memory holes of the plurality of memory holes remain inactive.

According to yet another aspect of the present disclosure, the bit lines of the set of bit lines extend at least partially in parallel relationship with one another. The active bit lines and inactive bit lines are arranged in alternating fashion.

According to still another aspect of the present disclosure, the memory block is a first memory block of a plurality of memory blocks. The step of performing the read operation includes performing a first read operation on the first memory block of the plurality of memory blocks while a plurality of bit lines are held at a first voltage that is greater than zero Volts. The method further includes the step of, without ramping the plurality of bit lines down from the first voltage, performing a second read operation on a second memory block of the plurality of memory blocks.

According to a further aspect of the present disclosure, during and between the first and second read operations, the plurality of active bit lines do not fall by more than 25% from the first voltage.

According to yet a further aspect of the present disclosure, the plurality of memory holes includes active memory holes with memory cells that contain data and includes inactive memory holes with memory cells that do not contain data. At least half of the memory holes of the plurality of memory holes are inactive memory holes.

A further aspect of the present disclosure is related to a method of performing a sensing operation in a memory device. The method includes the step of preparing a memory block that includes an array of memory cells arranged in a plurality of word lines and in a plurality of memory holes. The plurality of memory holes are in electrical communication with respective bit lines of a set of bit lines. The method further includes the step of performing a read operation on a selected word line of the plurality of word lines in the memory block using a plurality of active bit lines of the set of bit lines. The active bit lines extend at least partially in parallel relationship with one another. Adjacent ones of the active bit lines being spaced apart from one another by at least 30 nm.

According to another aspect of the present disclosure, the active bit lines are in electrical communication with active sense amplifiers and memory cells during the read operation. The set of bit lines further includes a plurality of inactive bit lines that are not in electrical communication with active sense amplifiers or memory cells during the read operation. At least one inactive bit line of the plurality of inactive bit lines is disposed between each pair of adjacent active bit lines.

According to yet another aspect of the present disclosure, the read operation includes discharging a plurality of sense nodes through the plurality of active bit lines and through a plurality of active memory holes of the plurality of memory holes while the plurality of inactive bit lines of the set of bit lines and a plurality of inactive memory holes of the plurality of memory holes remain inactive.

According to still another aspect of the present disclosure, the memory block is a first memory block of a plurality of memory blocks in a plane and the read operation is a first read operation. The method further includes the step of, during the first read operation on the first memory block of the plurality of memory blocks, holding the plurality of active bit lines are held at a first voltage that is greater than zero Volts. Without ramping the plurality of active bit lines down from the first voltage, the method continues with the step of performing a second read operation on a second memory block of the plurality of memory blocks while the plurality of active bit lines are held at the first voltage.

According to a further aspect of the present disclosure, during and between the first and second read operations, the plurality of active bit lines do not fall by more than 25% from the first voltage.

According to yet a further aspect of the present disclosure, the plurality of memory holes includes active memory holes with memory cells that contain data and inactive memory holes with memory cells that do not contain data, and wherein at least half of the memory holes of the plurality of memory holes are inactive memory holes.

BRIEF DESCRIPTION OF THE DRAWINGS

These and other features and advantages of the subject disclosure will become more readily appreciated when considered in connection with the following description of the presently preferred embodiments, appended claims and accompanying drawings, in which:

DETAILED DESCRIPTION OF THE ENABLING EMBODIMENTS

Technology is described for increasing the bandwidth of NAND memory to provide a viable alternative to HBM devices. More specifically, read techniques are provided where a plurality of bit lines remain at elevated voltages during and between read operations to reduce read time tRead and improver read performance. These techniques are discussed in further detail below.

Figure 1:
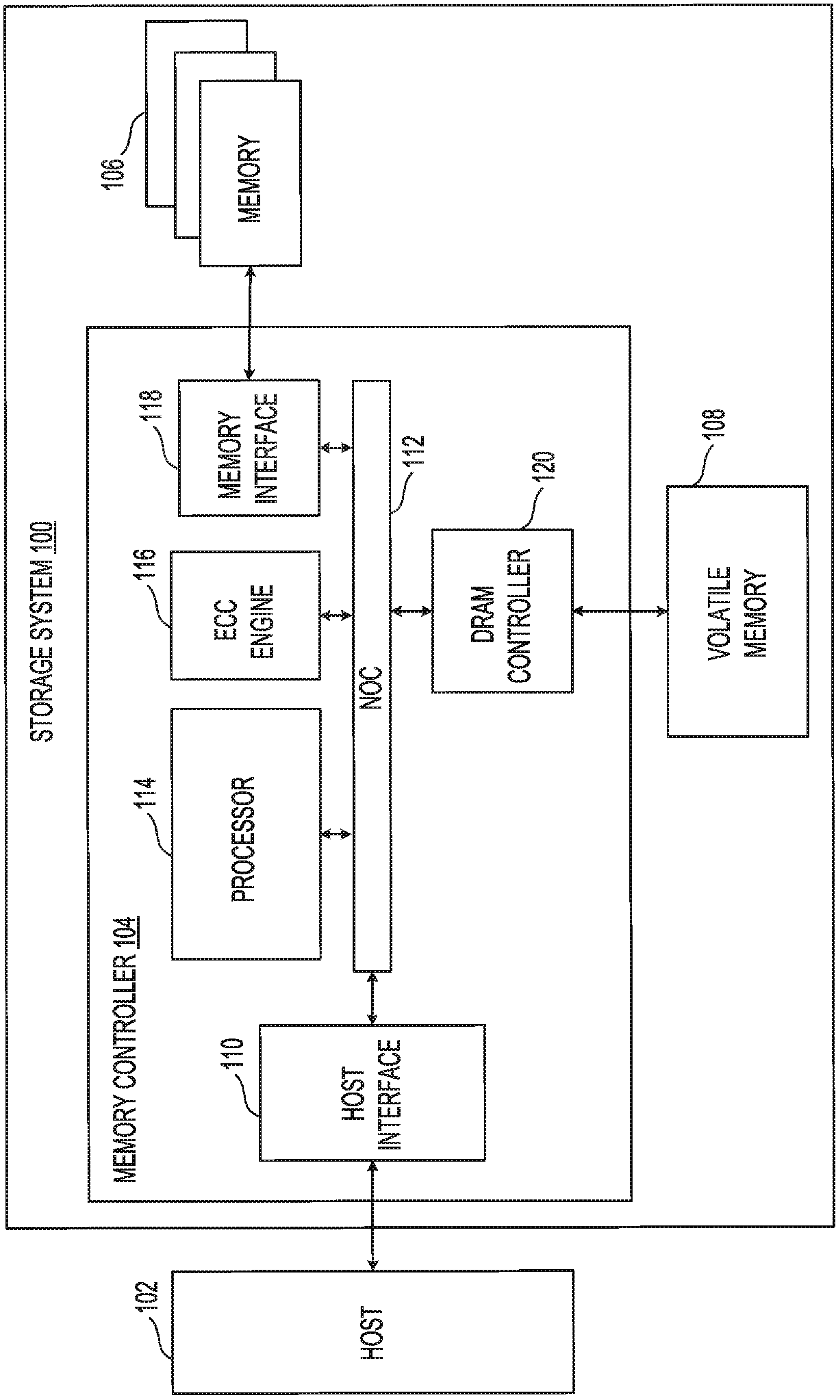
FIG. 1 is a block diagram depicting one embodiment of a storage system.

FIG. 1 is a block diagram of one embodiment of a storage system 100 that implements the proposed technology described herein. In one embodiment, the storage system 100 is a solid state drive ("SSD"). The storage system 100 also can be a memory card, a USB drive, or any other type of storage system. In other words, the proposed technology is not limited to any one type of memory system.

The storage system 100 is connected to a host 102, which can be a computer; server; electronic device (e.g., smart phone, tablet or other mobile device); appliance; or another apparatus that uses memory and has data processing capabilities. In some embodiments, the host 102 is separate from, but connected to, the storage system 100. In other embodiments, the storage system 100 is embedded within the host 102.

The components of the storage system 100 depicted in FIG. 1 are electrical circuits. The storage system 100 includes a memory controller 104 connected to non-volatile memory 106 and local high speed volatile memory 108 (e.g., DRAM). A local high speed volatile memory 108 is used by memory controller 104 to perform certain functions. For example, the local high speed volatile memory 108 stores logical to physical address translation tables ("L2P tables").

The memory controller 104 includes a host interface 110 that is connected to and in communication with the host 102.

In one embodiment, a host interface 110 implements an NVM Express (NVMe) over PCI Express (PCIe). Other interfaces can also be used, such as SCSI, SATA, etc. The host interface 110 also is connected to a network-on-chip (NOC) 112.

An NOC is a communication subsystem on an integrated circuit. The NOC's can span synchronous and asynchronous clock domains or use un-clocked asynchronous logic. NOC technology applies networking theory and methods to on-chip communications and brings notable improvements over conventional bus and crossbar interconnections. The NOC improves the scalability of systems on a chip (SoC) and the power efficiency of complex SoCs compared to other designs.

The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, the NOC 112 can be replaced by a bus.

Connected to and in communication with NOC 112 is a processor 114, an ECC engine 116, a memory interface 118, and a DRAM controller 120. The DRAM controller 120 is used to operate and communicate with local high speed volatile memory 108 (e.g., DRAM). In other embodiments, the local high speed volatile memory 108 can be SRAM or another type of volatile memory.

In operation, the processor 114 performs the various controller memory operations, such as programming, erasing, reading, and memory management processes. In one embodiment, the processor 114 is programmed by firmware. In other embodiments, the processor 114 is a custom and dedicated hardware circuit without any software. The processor 114 also implements a translation module, as a software/firmware process or as a dedicated hardware circuit.

In many systems, the non-volatile memory is addressed internally to the storage system using physical addresses associated with one or more memory dies. However, the host system will use logical addresses to address the various memory locations. This enables the host to assign data to consecutive logical addresses, while the storage system is free to store the data as it wishes among the locations of the one or more memory dies. To implement this system, the memory controller 104 (e.g., the translation module) performs address translation between the logical addresses used by the host and the physical addresses used by the memory dies.

One example implementation is to maintain tables (i.e., the L2P tables referenced above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 108 cannot hold all of the L2P tables. In such a case, the entire set of L2P tables are stored in non-volatile memory 106 and a subset of the L2P tables are cached (L2P cache) in the local high speed volatile memory 108.

The ECC engine 116 performs error correction services. For example, the ECC engine 116 performs data encoding and decoding, as per an implemented ECC technique. In one embodiment, the ECC engine 116 is an electrical circuit programmed by software. For example, the ECC engine 116 can be a processor that can be programmed. In other embodiments, the ECC engine 116 is a custom and dedicated hardware circuit without any software. In another embodiment, the function of ECC engine 116 is implemented by the processor 114.

The memory interface 118 communicates with the non-volatile memory 106. In one embodiment, the memory interface provides a Toggle Mode interface. However, other interfaces also can be used. In some example implementations, the memory interface 118 (or another portion of the controller 104) implements a scheduler and buffer for transmitting data to and receiving data from one or more memory die.

Figure 2A:
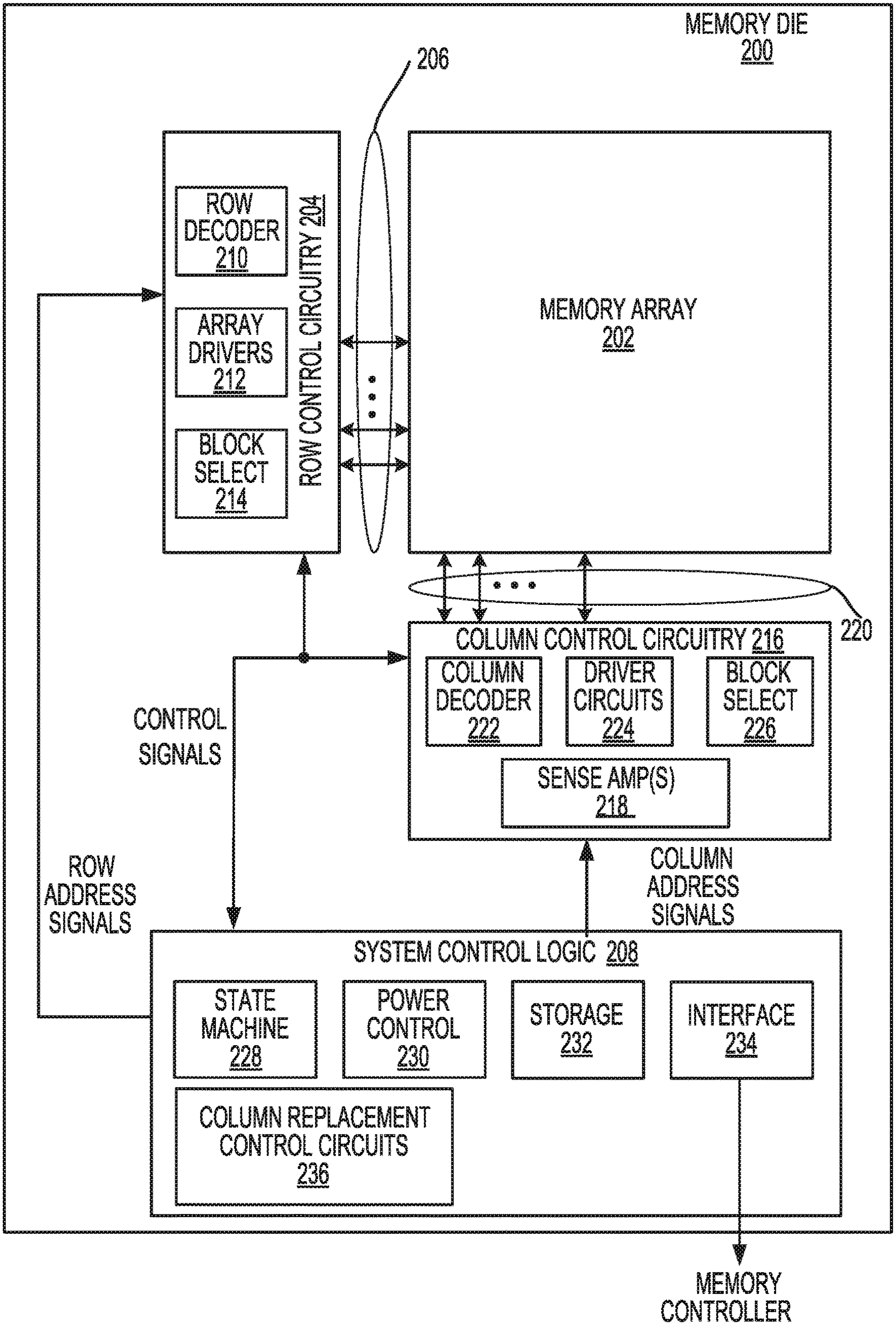
FIG. 2A is a block diagram of one embodiment of a memory die.

In one embodiment, the non-volatile memory 106 includes one or more memory die. FIG. 2A is a functional block diagrams of one embodiment of a memory die 200 that includes the non-volatile memory 106. Each of the one or more memory dies of non-volatile memory 106 can be implemented as the memory die 200 of FIG. 2A. The components depicted in FIG. 2A are electrical circuits.

The memory die 200 includes a memory array 202 that can include non-volatile memory cells, as described in further detail below. The memory array 202 includes a plurality of layers of word lines that are organized as rows, and a plurality of layers of bit lines that are organized as columns. However, other orientations can also be implemented.

The memory die 200 also includes row control circuitry 204, whose outputs 206 are connected to respective word lines of the memory array 202. In operation, the row control circuitry 204 receives a group of M row address signals and one or more various control signals from a system control logic circuit 208 and may include such circuits as row decoders 210, array terminal drivers 212, and block select circuitry 214 for both reading and writing (programming) operations.

The row control circuitry 204 also may include read/write circuitry. The memory die 200 also includes column control circuitry 216 including sense amplifier(s) 218 whose input/outputs 220 are connected to respective bit lines of the memory array 202. Although only a single block is shown for memory array 202, the memory die 200 can include multiple arrays that can be individually accessed.

The column control circuitry 216 receives a group of N column address signals and one or more various control signals from system control logic 208. The column control circuitry 216 may also include such circuits as column decoders 222; array terminal receivers or driver circuits 224; block select circuitry 226; read/write circuitry; and I/O multiplexers.

The system control logic 208 receives data and commands from memory controller 104 (FIG. 1) and provides output data and status to host 102. In some embodiments, the system control logic 208, which includes one or more electrical circuits, includes a state machine 228 that provides die-level control of memory operations. In one embodiment, the state machine 228 is programmable by software. In other embodiments, the state machine 228 does not use software and is completely implemented in hardware (e.g., electrical circuits). In another embodiment, the state machine 228 is replaced by a micro-controller or microprocessor, either on or off the memory chip.

The system control logic 208 also can include a power control module 230 that controls the power and voltages supplied to the rows and columns of memory structure 202 during memory operations and may include charge pumps and regulator circuits for creating regulating voltages. The system control logic 208 also includes storage 232 (e.g., RAM, registers, latches, etc.), which may be used to store parameters for operating memory array 202.

In operation, commands and data are transferred between the memory controller 104 and the memory die 200 via a memory controller interface 234 (also referred to as a "communication interface"). The memory controller interface 234 is an electrical interface for communicating with memory controller 104. Examples of the memory controller interface 234 include a Toggle Mode Interface and an Open NAND Flash Interface (ONFI). Other I/O interfaces can also be used in other embodiments.

In an embodiment, the system control logic 208 also includes column replacement control circuits 236, described in more detail below.

In some embodiments, all elements of the memory die 200, including the system control logic 208, can be formed as part of a single die. In other embodiments, some or all of the system control logic 208 can be formed on a different die.

In one embodiment, the memory structure 202 comprises a three-dimensional memory array of non-volatile memory cells in which multiple memory levels are formed above a single substrate, such as a wafer. The memory structure 202 may include any type of non-volatile memory that are monolithically formed in one or more physical levels of memory cells having an active area disposed above a silicon (or other type of) substrate. In one example, the non-volatile memory cells include charge-trapping layers and are arranged in a plurality of vertical NAND strings.

In another embodiment, the memory structure 202 includes a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. For example, suitable technologies for the memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of memory structure 202 include two dimensional arrays, three dimensional arrays, cross-point arrays, stacked two dimensional arrays, vertical bit line arrays, and the like. One example of a ReRAM cross-point memory includes reversible resistance-switching elements arranged in cross-point arrays accessed by X lines and Y lines (e.g., word lines and bit lines).

In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, and the ferromagnetic layers are separated by a thin insulating layer. One of the two ferromagnetic layers is a permanent magnet that is set to a particular polarity, and the other ferromagnetic layer's magnetization can be changed to match that of an external field to store memory. The memory array may be built from a grid of such memory cells. In one embodiment, for programming, each memory cell lies between a pair of write lines that are arranged at right angles to each other, parallel to the cell, one above and one below the cell. When current is passed through the write lines, an induced magnetic field is created. MRAM based memory embodiments will be discussed in more detail below.

Phase change memory (PCM) exploits the unique behavior of chalcogenide glass. One embodiment uses a GeTe—$Sb_2Te_3$ super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or another wave. These memory elements within the individual selectable memory cells, or bits, may include a further series element that is a selector, such as an ovonic threshold switch or metal insulator substrate.

The technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) the memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202. However, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to system control logic 208, reduced availability of area can limit the available functions that can be implemented on-chip. Consequently, a basic trade-off in the design of a memory die for the storage system 100 may be the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based.

Elements such as the sense amplifier circuits, charge pumps, logic elements in a state machine, and other peripheral circuitry in the system control logic 208 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 2A onto a separately formed die that is then bonded together with another die. More specifically, the memory structure 202 can be formed on one die (referred to as the memory die) and some or all of the peripheral circuitry elements, including one or more control circuits, can be formed on a separate die (referred to as the control die). A memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology.

For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array.

The two die can then be bonded together in a bonded multi-die memory circuit, with the array on the one die connected to the periphery elements on the other die. Although the following will focus on a bonded memory circuit of one memory die and one control die, other embodiments can use more die, such as two memory die and one control die, for example.

Figure 2B:
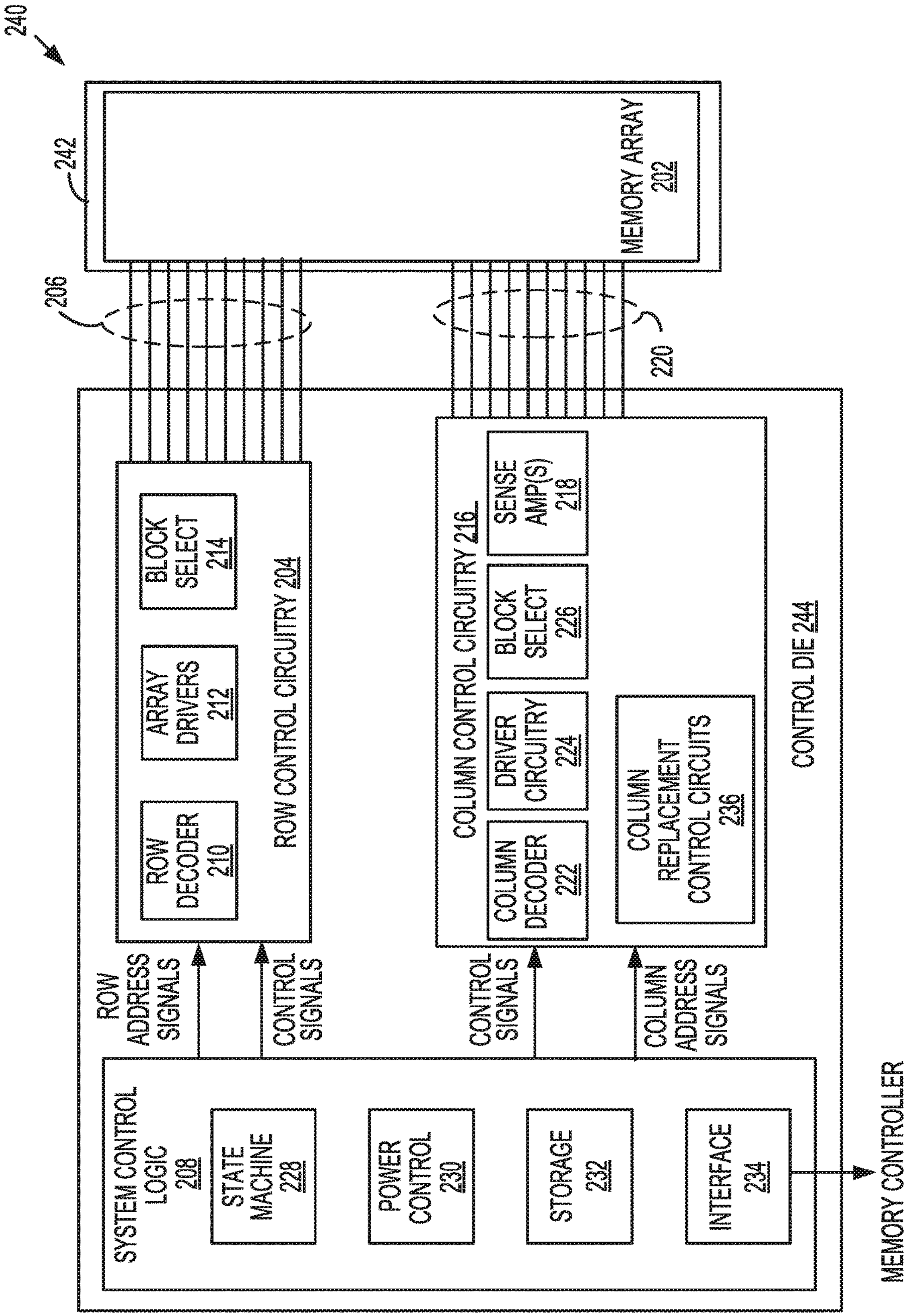
FIG. 2B is a block diagram of one embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 240. One or more integrated memory assemblies 240 may be used to implement the non-volatile memory 106 of storage system 100.

The integrated memory assembly 240 includes two types of semiconductor die (or more succinctly, "die"). The memory die 242 includes the memory structure 202 with the non-volatile memory cells. A control die 244 includes control circuitry 208, 216, and 204 (as described above). In some embodiments, the control die 244 is configured to connect to the memory structure 202 in the memory die 242. In some embodiments, the memory die 242 and control die 244 are bonded together.

FIG. 2B shows an example of the peripheral circuitry, including control circuits, formed in a peripheral circuit or control die 244 coupled to memory structure 202 formed in memory die 242. Common components are labelled similarly to FIG. 2A. The system control logic 208, the row control circuitry 204, and the column control circuitry 216 are located in the control die 244. In some embodiments, all or a portion of column control circuitry 216 and all or a portion of the row control circuitry 204 are located on memory die 242. In some embodiments, some of the circuitry in the system control logic 208 is located on the memory die 242.

The system control logic 208, the row control circuitry 204, and the column control circuitry 216 may be formed by a common process (e.g., CMOS process), so that adding elements and functions, such as the ECC controller, more typically found on a memory controller 104 may require few or no additional process steps, i.e., the same process steps used to fabricate controller 104 may also be used to fabricate the system control logic 208, the row control circuitry 204, and the column control circuitry 216.

Thus, while moving such circuits from a die such as the memory die 242 may reduce the number of steps needed to fabricate such a die, adding such circuits to a die such as control die 244 may not require many additional process steps. The control die 244 also could be referred to as a CMOS die, due to the use of CMOS technology to implement some or all of the control circuitry 204, 208, 216.

FIG. 2B shows column control circuitry 216, including the sense amplifier(s) 218, on control die 244 coupled to memory structure 202 on memory die 242 through electrical paths 220. The electrical paths 220 may provide an electrical connection between the column decoder 222, the driver circuitry 224, the block select 226, and the bit lines of the memory structure 202. In an embodiment, the column control circuitry 216 also includes column replacement control circuits 236, which are described in more detail below.

Electrical paths may extend from the column control circuitry 216 in the control die 244 through pads on the control die 244 that are bonded to corresponding pads of the memory die 242, which are connected to the bit lines of the memory structure 202. Each bit line of the memory structure 202 may have a corresponding one of the electrical paths 220, including a pair of bond pads, which connects to the column control circuitry 216.

Similarly, the row control circuitry 204, including the row decoder 210, the array drivers 212, and the block select 214 are coupled to the memory structure 202 through electrical paths 206. Each of the electrical paths 206 may correspond to a data containing word line, a dummy word line, or a select gate line. Additional electrical paths may also be provided between control die 244 and memory die 242.

For purposes of this document, the phrases "a control circuit," "control circuitry," or "one or more control circuits" can include any one of or any combination of the memory controller 104; the state machine 228; all or a portion of the system control logic 208; all or a portion of row control circuitry 204; all or a portion of column control circuitry 216; a microcontroller; a microprocessor; and/or other similar functioned circuits.

The control circuit can include hardware only or a combination of hardware and software (including firmware). For example, one or more controllers programmed by firmware to perform the functions described herein is one example of a control circuit. A control circuit can include a processor, FGA, ASIC, integrated circuit, or other type of circuit.

In some embodiments, there is more than one control die 244 and more than one memory die 242 in an integrated memory assembly 240. In some embodiments, the integrated memory assembly 240 includes a stack of multiple control dies 244 and multiple memory dies 242.

Figure 3A:
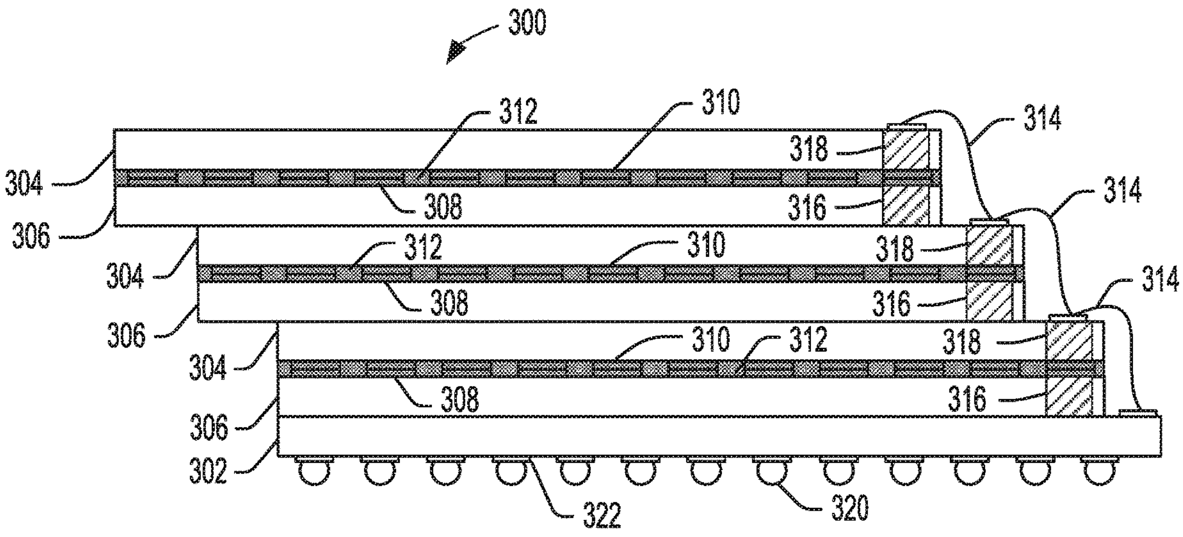
FIGS. 3A and 3B depict different embodiments of integrated memory assemblies.

FIG. 3A depicts a side view of an embodiment of an integrated memory assembly 300 stacked on a substrate 302 (e.g., a stack including control die 304 and memory die 306). In this embodiment, the integrated memory assembly 300 has three control die 304 and three memory die 306. In some embodiments, there are more than three memory die 306 and more than three control die 304.

Each control die 304 is affixed (e.g., bonded) to at least one memory die 306. Some of the bond pads 308/310 are depicted, although there may be many more bond pads. A space between two die 306, 304 that are bonded together is filled with a solid layer 312, which may be formed from epoxy or other resin or polymer. This solid layer 312 protects the electrical connections between the die 306, 304 and further secures the die together. Various materials may be used as solid layer 312, but in some embodiments, it may be Hysol epoxy resin from Henkel Corp., having offices in California, USA.

Integrated memory assembly 300 may for example be stacked with a stepped offset, leaving the bond pads at each level uncovered and accessible from above. Wire bonds 314 connected to the bond pads connect control die 304 to substrate 302. A number of such wire bonds may be formed across the width of each control die 304 (i.e., into the page of FIG. 3A).

A memory die through silicon via (TSV) 316 may be used to route signals through each memory die 306. A control die TSV 318 may be used to route signals through each control die 304. The TSVs 316, 318 may be formed before, during or after formation of the integrated circuits in semiconductor die 306, 304. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 320 optionally may be affixed to contact pads 322 on a lower surface of substrate 302. Solder balls 320 may be used to couple integrated memory assembly 300 electrically and mechanically to a host device such as a printed circuit board. Solder balls 320 may be omitted where the integrated memory assembly 300 is to be used as an LGA package. Solder balls 320 may form a part of an interface between integrated memory assembly 300 and memory controller 104 (FIG. 1).

Figure 3B:
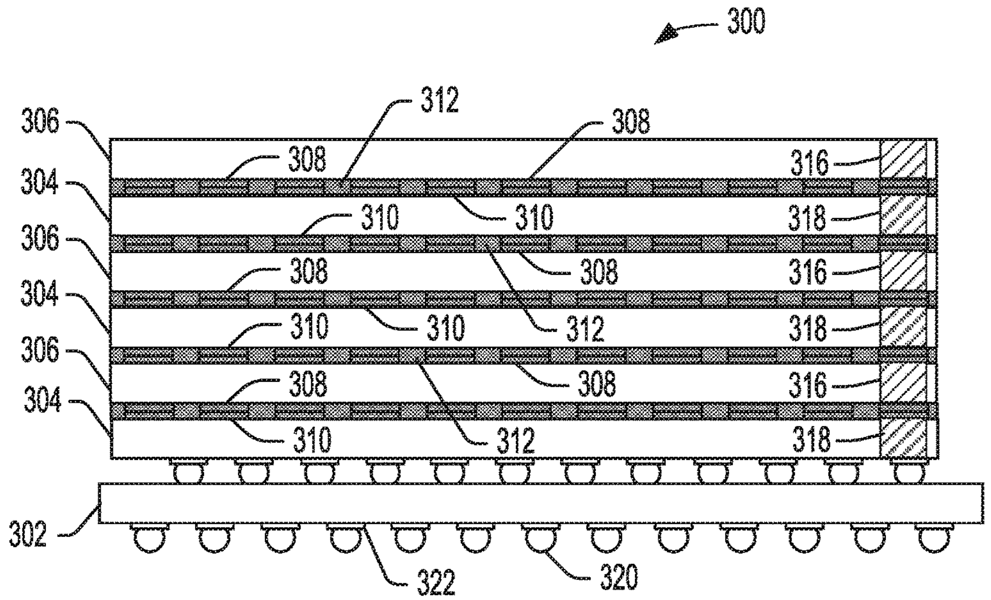

FIG. 3B depicts a side view of another embodiment of an integrated memory assembly 300 stacked on a substrate 302. The integrated memory assembly 300 of FIG. 3B has three control die 304 and three memory die 306. In some embodiments, there are many more than three memory die 306 and many more than three control die 304. In this example, each control die 304 is bonded to at least one memory die 306. Optionally, a control die 304 may be bonded to two or more memory die 306.

Some of the bond pads 308, 310 are depicted, but there may be many more bond pads than are illustrated. A space between two die 306, 304 that are bonded together is filled with a solid layer 312, which may be formed from epoxy or other resin or polymer. In contrast to the example in FIG. 3A, the integrated memory assembly 300 of FIG. 3B does not have a stepped offset. A memory die TSV 316 may be used to route signals through each memory die 306. A control die TSV 318 may be used to route signals through each control die 304.

As has been briefly discussed above, the control die 304 and the memory die 306 may be bonded together. Bond pads on each control die 304 and each memory die 306 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat also may be applied. In embodiments using cu-to-cu bonding, the bond pads may be about 5 μm square and spaced from each other with a pitch of 5 μm to 5 μm. Although this process is referred to herein as cu-to-cu bonding, this term also may apply even where the bond pads are formed of materials other than copper. When the area of bond pads is small, it may be difficult to bond the semiconductor die together. The size of and pitch between bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 μm square and spaced from each other with a pitch of 1 μm to 5 μm. Bonding techniques may be used providing bond pads with even smaller (or greater) sizes and pitches.

Some embodiments may include a film on a surface of the control die 304 and the memory die 306. Where no such film is initially provided, a space between the die may be under filled with an epoxy or other resin or polymer. The under-fill material may be applied as a liquid which then hardens into a solid layer. This under-fill step protects the electrical connections between control die 304 and memory die 306, and further secures the die together. Various materials may be used as under-fill material, such as Hysol epoxy resin from Henkel Corp., having offices in California, USA.

Figure 4A:
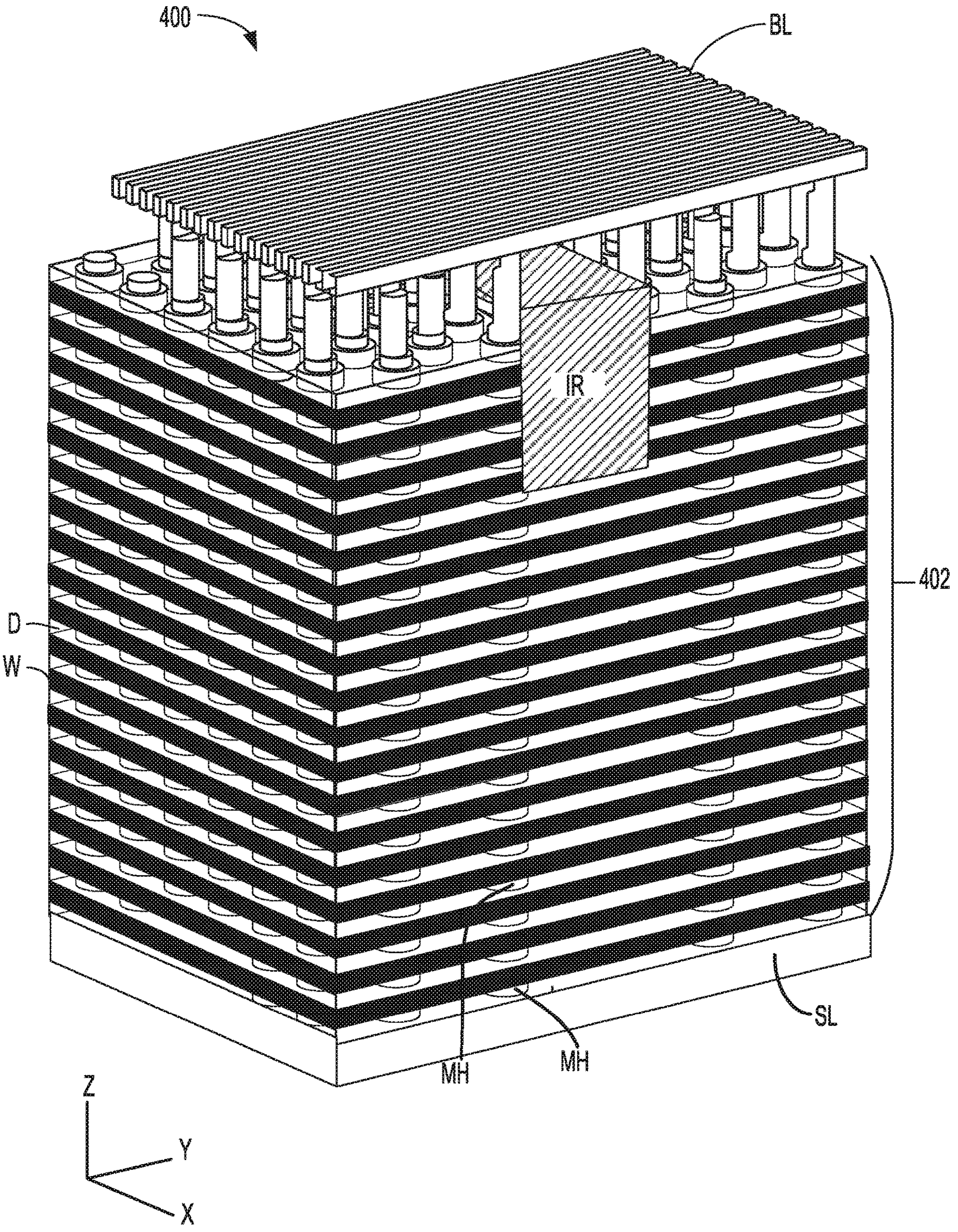
FIG. 4A is a perspective view of a portion of one embodiment of a monolithic three dimensional memory structure.

FIG. 4A is a perspective view of a portion of one example embodiment of a monolithic three dimensional memory array/structure included in memory structure 202, which includes a plurality non-volatile memory cells arranged as vertical NAND strings. For example, FIG. 4A shows a portion 400 of one block of memory. The structure depicted includes a set of bit lines BL positioned above a stack 402 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements.

As will be explained below, in one embodiment the alternating dielectric layers and conductive layers are divided into, for example, four or five (or a different number of) regions by isolation regions IR. FIG. 4A shows one isolation region IR separating two regions. Below the alternating dielectric layers and word line layers is a common source line layer SL. Memory holes are formed in the stack of alternating dielectric layers and conductive layers. For example, one of the memory holes is marked as MH. Note that in FIG. 4A, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells.

The non-volatile memory cells are arranged in memory holes, and each memory cell can store one or more bits of data, e.g., up to five bits of data per memory cell. More details of the three dimensional monolithic memory array that comprises memory structure 202 is provided below.

Figure 4B:
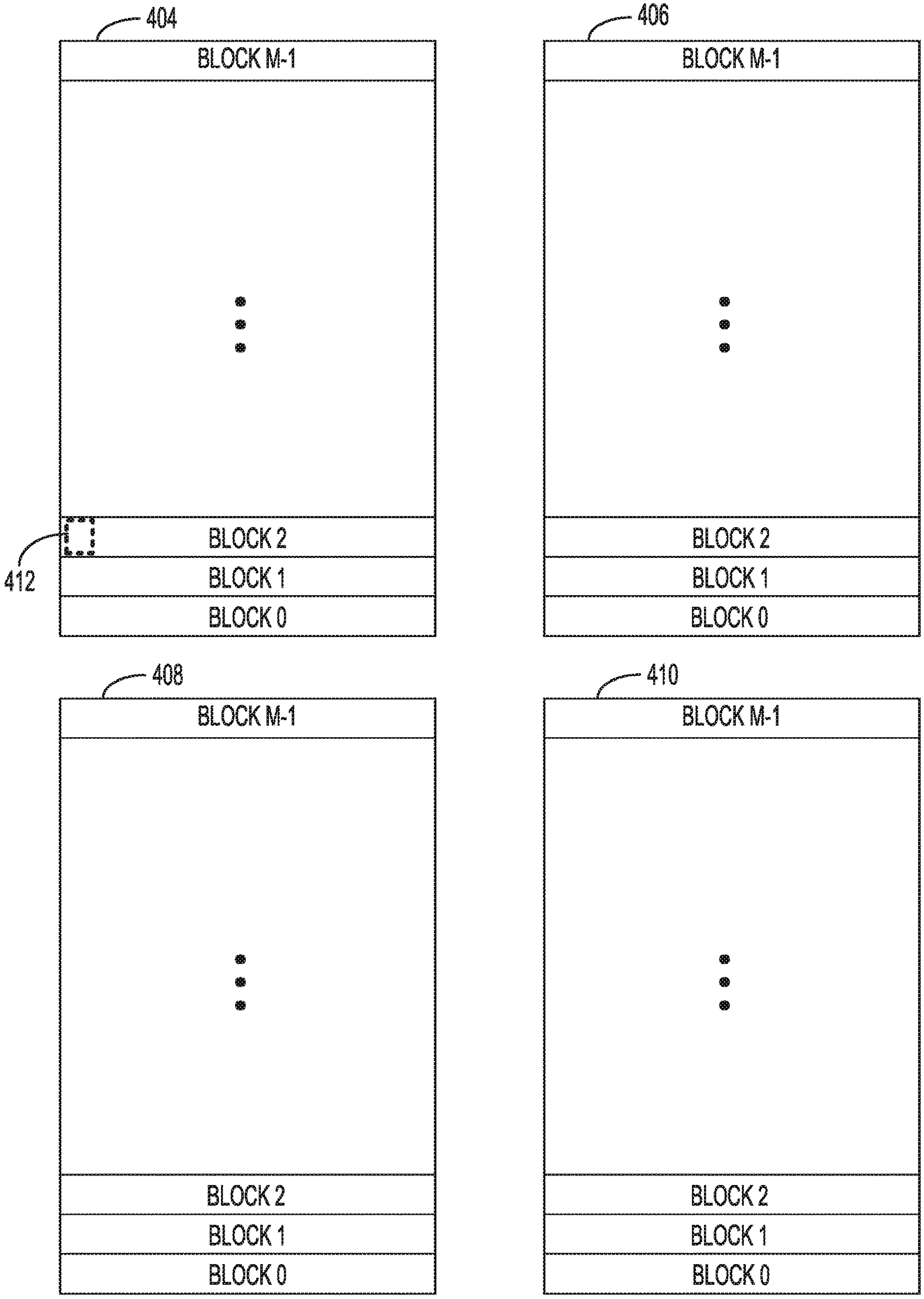
FIG. 4B is a block diagram of one embodiment of a memory structure having four planes.

FIG. 4B is a block diagram explaining one example organization of memory structure 202, which is divided into four planes 404, 406, 408 and 410. Each plane is then divided into M blocks. In one example, each plane has about 2,000 blocks ("Block 0" to "Block M−1" with M being 2,000). However, different numbers of blocks and planes can also be used.

In one embodiment, a block of memory cells is a unit of erase. That is, all memory cells of a block are erased together. In other embodiments, the blocks can be divided into sub-blocks, each of which includes a plurality of word lines, and the sub-blocks can be the unit of erase. Memory cells also can be grouped into blocks for other reasons, such as to organize the memory structure to enable the signaling and selection circuits.

In some embodiments, a block represents groups of connected memory cells as the memory cells of a block share a common set of word lines. For example, the word lines for a block are all connected to all of the vertical NAND strings for that respective block. Although FIG. 4B shows four planes, each of which includes a plurality of blocks, more or fewer than four planes can be implemented in the memory structure 202. In some embodiments, the memory structure includes eight planes.

Each block typically is divided into one or more pages, with each page being a unit of programming/writing and a unit of reading. Other units of programming also can be used. In an embodiment, one or more pages of data are typically stored in one row of memory cells. For example, one or more pages of data may be stored in memory cells connected to a common word line. In an embodiment, a page includes data stored in all memory cells connected to a common word line within the block.

Figure 4C:
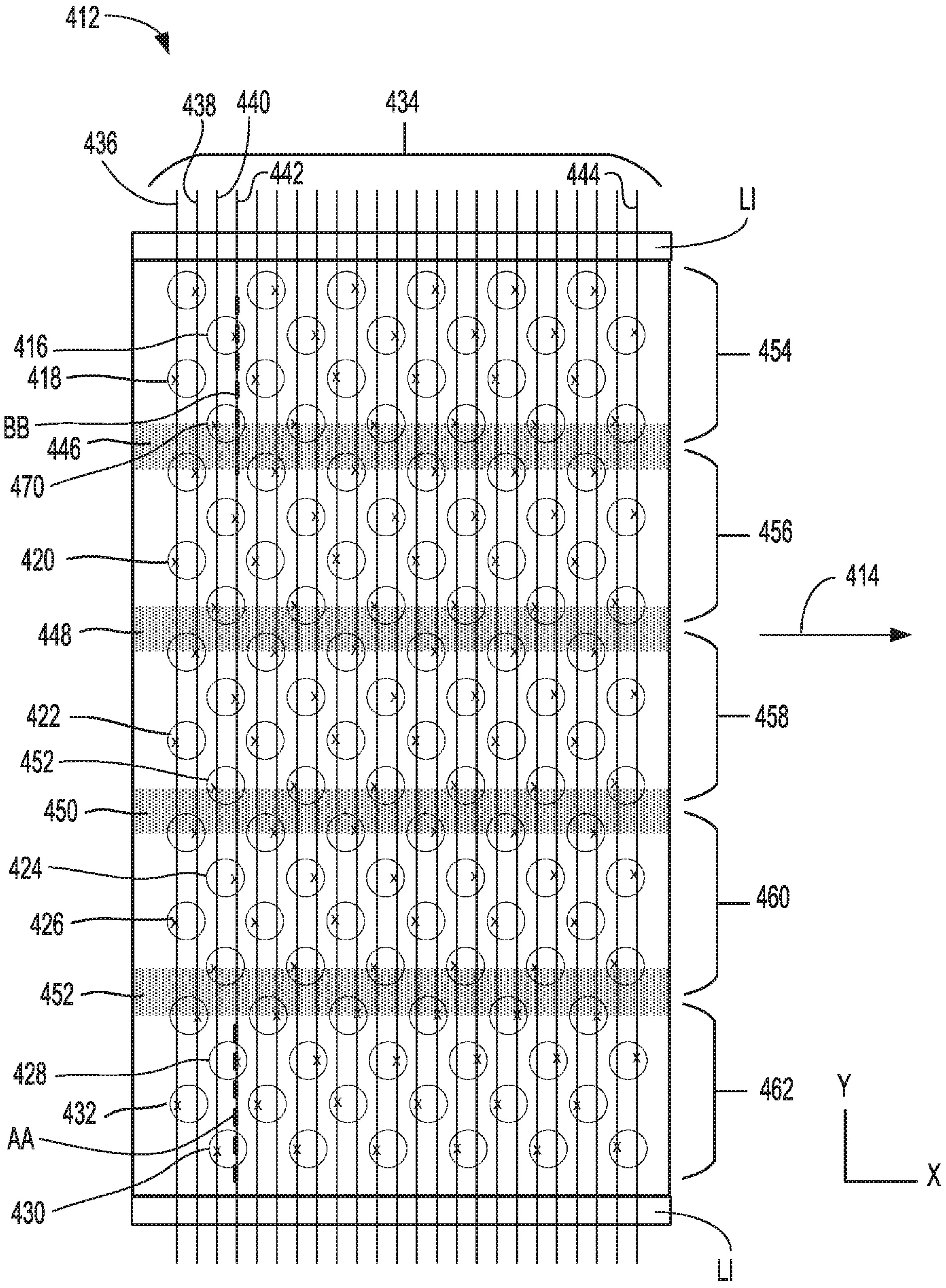
FIG. 4C depicts a top view of a portion of one embodiment of a block of memory cells.

FIGS. 4C-4G depict an example three dimensional ("3D") NAND structure that corresponds to the structure of FIG. 4A and can be used to implement the memory structure 202 of FIGS. 2A and 2B. FIG. 4C is a block diagram that depicts a top view of a portion 412 of Block 2 of plane 404. As can be seen from FIG. 4C, the block depicted in FIG. 4C extends in the direction of 414. In one embodiment, the memory array has many such layers with only the top layer being illustrated in FIG. 4C.

FIG. 4C depicts a plurality of circles that represent the memory holes, which are also referred to as vertical columns. Each of the memory holes/vertical columns includes multiple select transistors (also referred to as a select gate or selection gate) and multiple memory cells. In one embodiment, each memory hole/vertical column implements a NAND string. For example, FIG. 4C labels a subset of the memory holes/vertical columns/NAND strings 416, 418, 420, 422, 424, 426, 428, 430, and 432.

FIG. 4C also depicts a set of bit lines 434, including bit lines 436, 438, 440, 442, 444. FIG. 4C shows twenty four bit lines because only a portion of the block is depicted. It is contemplated that more than twenty four bit lines connected to memory holes/vertical columns of the block. Each of the circles representing memory holes/vertical columns has an "x" to indicate its connection to one of the bit lines. For example, bit line 436 is connected to the memory holes/vertical columns 418, 420, 422, 426, and 432. The bit lines 436, 438, 440, 442 also are in electrical communication with all other blocks in a given plane.

The block depicted in FIG. 4C includes a set of isolation regions 446, 448, 450 and 452, which are formed of $SiO_2$. However, other dielectric materials also can be used. Isolation regions 446, 448, 450, and 452 serve to divide the top layers of the block into five regions. For example, the top layer depicted in FIG. 4C is divided into regions 454, 456, 458, 460, and 462.

In one embodiment, the isolation regions only divide the layers used to implement select gates so that NAND strings in different regions can be independently selected. In one example implementation, a bit line connects to one memory hole/vertical column/NAND string in each of regions 454, 456, 458, 460, and 462. In that implementation, each block has twenty-four rows of active columns and each bit line connects to five rows in each block.

In one embodiment, all of the five memory holes/vertical columns/NAND strings connected to a common bit line are connected to the same set of word lines; therefore, the system uses the drain side selection lines to choose one (or another subset) of the five to be subjected to a memory operation (program, verify, read, and/or erase).

FIG. 4C also shows Line Interconnects LI, which are metal connections to the source line SL from above the memory array. Line Interconnects LI are positioned adjacent regions 454 and 462.

Although FIG. 4C shows each region 454, 456, 458, 460, and 462 as having four rows of memory holes/vertical columns, five regions and twenty four rows of memory holes/vertical columns in a block, those exact numbers are an example implementation. Other embodiments may include more or fewer regions per block; more or fewer rows of memory holes/vertical columns per region; and more or fewer rows of vertical columns per block.

FIG. 4C also shows the memory holes/vertical columns being staggered. In other embodiments, different patterns of staggering can be used. In some embodiments, the memory holes/vertical columns are not staggered.

Figure 4D:
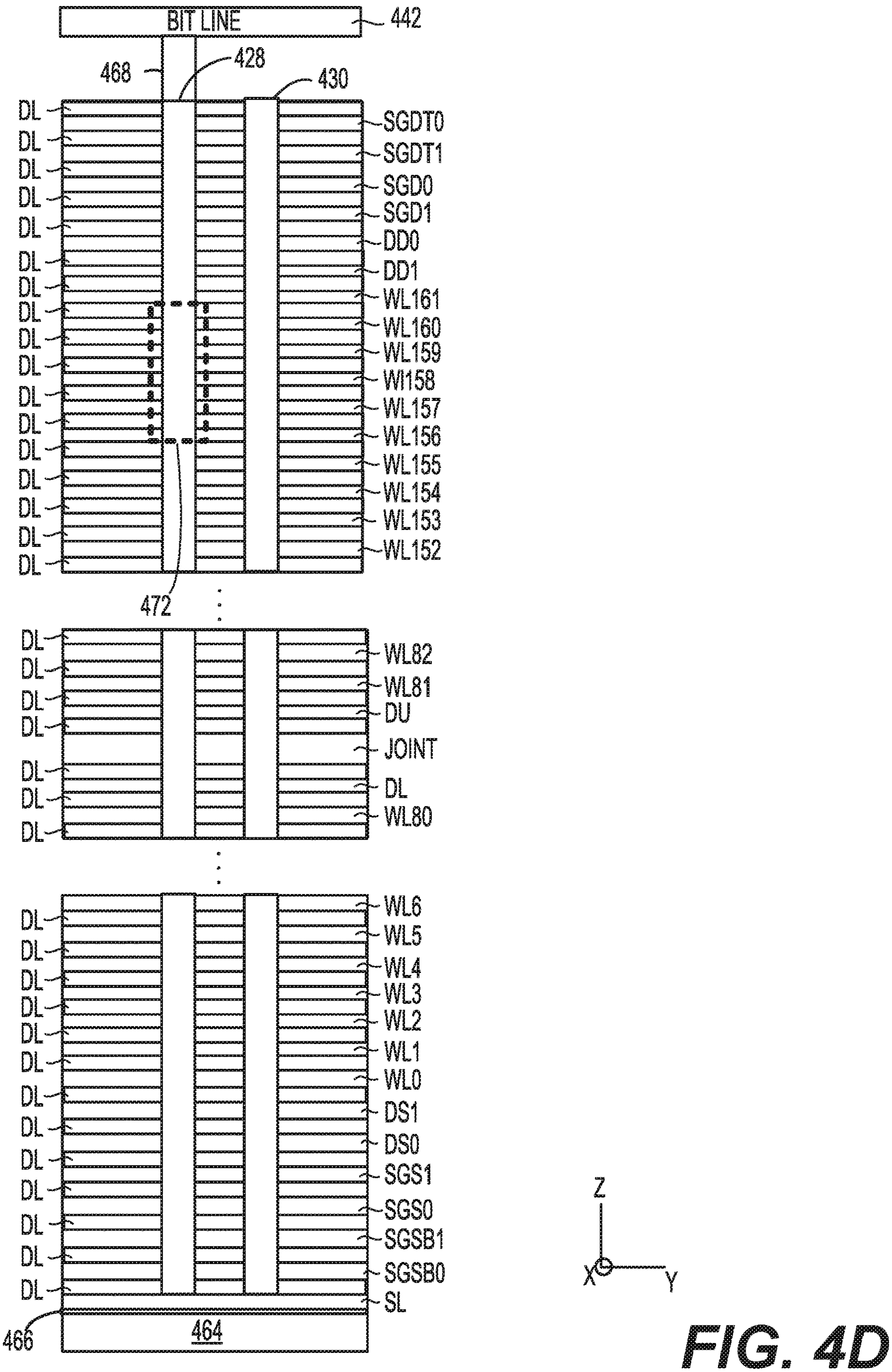
FIG. 4D depicts a cross sectional view of a portion of one embodiment of a block of memory cells.

FIG. 4D depicts a portion of one embodiment of a three dimensional memory structure 202 showing a cross-sectional view along line AA of FIG. 4C. This cross sectional view cuts through memory holes/vertical columns (NAND strings) 428 and 430 of region 462 (see FIG. 4C).

The structure of FIG. 4D includes two drain side select layers SGD0 and SGD1; two source side select layers SGS0 and SGS1; two drain side GIDL generation transistor layers SGDT0 and SGDT1; two source side GIDL generation transistor layers SGSB0 and SGSB1; two drain side dummy word line layers DD0 and DD1; two source side dummy word line layers DS0 and DS1; dummy word line layers DU and DL that are separated by a joint; one hundred and sixty two word line layers WL0-WL161 for connecting to data memory cells; and dielectric layers DL. Other embodiments can implement more or fewer than the numbers described above for FIG. 4D. In one embodiment, SGD0 and SGD1 are connected together and SGS0 and SGS1 are connected together. In other embodiments, more or fewer SGDs (greater or lesser than two) are connected together and more or fewer SGS devices (greater or lesser than two) are connected together.

In one embodiment, erasing the memory cells is performed using gate induced drain leakage (GIDL), which includes generating charge carriers at the GIDL generation transistors such that the carriers get injected into the charge trapping layers of the NAND strings to change (reduce) respective threshold voltages Vt of the memory cells. In the embodiment of FIG. 4D, there are two GIDL generation transistors at each end of the NAND string; however, in other embodiments there are more or fewer than two GIDL generation transistors.

Embodiments that use GIDL at both sides of the NAND string may have GIDL generation transistors at both sides. Embodiments that use GIDL at only the drain side of the NAND string may have GIDL generation transistors only at the drain side. Embodiments that use GIDL at only the source side of the NAND string may have GIDL generation transistors only at the source side.

The GIDL generation transistors have an abrupt PN junction to generate the charge carriers for GIDL and, during fabrication, a phosphorous diffusion is performed at the polysilicon channel of the GIDL generation transistors. In some cases, the GIDL generation transistor with the shallowest phosphorous diffusion is the GIDL generation transistor that generates the charge carriers during erase. However, in some embodiments charge carriers can be generated by GIDL at multiple GIDL generation transistors at a particular side of the NAND string.

The memory holes/vertical columns 428, 430 are depicted protruding through the drain side select layers, source side select layers, dummy word line layers, GIDL generation transistor layers and word line layers. In one embodiment, each memory hole/vertical column comprises a vertical NAND string. Below the memory holes/vertical columns and the layers listed below is substrate 464, an insulating film 466 on the substrate, and source line SL. The NAND string of memory hole/vertical column 428 has a source end at a bottom of the stack and a drain end at a top of the stack. As in agreement with FIG. 4C, FIG. 4D show vertical memory hole/column 428 connected to bit line 442 via connector 468.

For ease of reference, drain side select layers, source side select layers, dummy word line layers, GIDL generation transistor layers and data word line layers collectively are referred to as conductive layers.

In one embodiment, the conductive layers are made from a combination of TiN and Tungsten. In other embodiments, other materials can be used to form the conductive layers, such as doped polysilicon, metal such as Tungsten, metal silicide, such as nickel silicide, tungsten silicide, aluminum silicide or the combination thereof.

In some embodiments, different conductive layers can be formed from different materials. Between conductive layers are dielectric layers DL. In one embodiment, the dielectric layers are made from $SiO_2$. In other embodiments, other dielectric materials can be used to form the dielectric layers.

The non-volatile memory cells are formed along memory holes/vertical columns which extend through alternating conductive and dielectric layers in the stack. In one embodiment, the memory cells are arranged in NAND strings. The word line layers WL0-W161 connect to memory cells (also called data memory cells). The dummy word line layers connect to a plurality of dummy memory cells, which do not store data. In some embodiments, the data memory cells and the dummy memory cells may have a same structure. The drain side select layers SGD0 and SGD1 are used to electrically connect and disconnect the NAND strings to and from the bit lines. The source side select layers SGS0 and SGS1 are used to electrically connect and disconnect the NAND strings to and from the source line SL.

FIG. 4D shows that the memory array is implemented as a two tier architecture, with the tiers separated by a joint area. In one embodiment, it is expensive and/or challenging to etch so many word line layers intermixed with dielectric layers. To ease this burden, a first stack of word line layers (e.g., WL0-WL80) are laid down with alternating dielectric layers, then the Joint area is laid down, and next, a second stack of word line layers (e.g., WL81-WL161) are laid down with alternating dielectric layers. The joint area is thus positioned between the first stack of word line layers and the second stack of word line layers. In one embodiment, the joint areas are made from the same materials as the word line layers. In other embodiments, there can no joint area or there can be multiple joint areas.

Figure 4E:
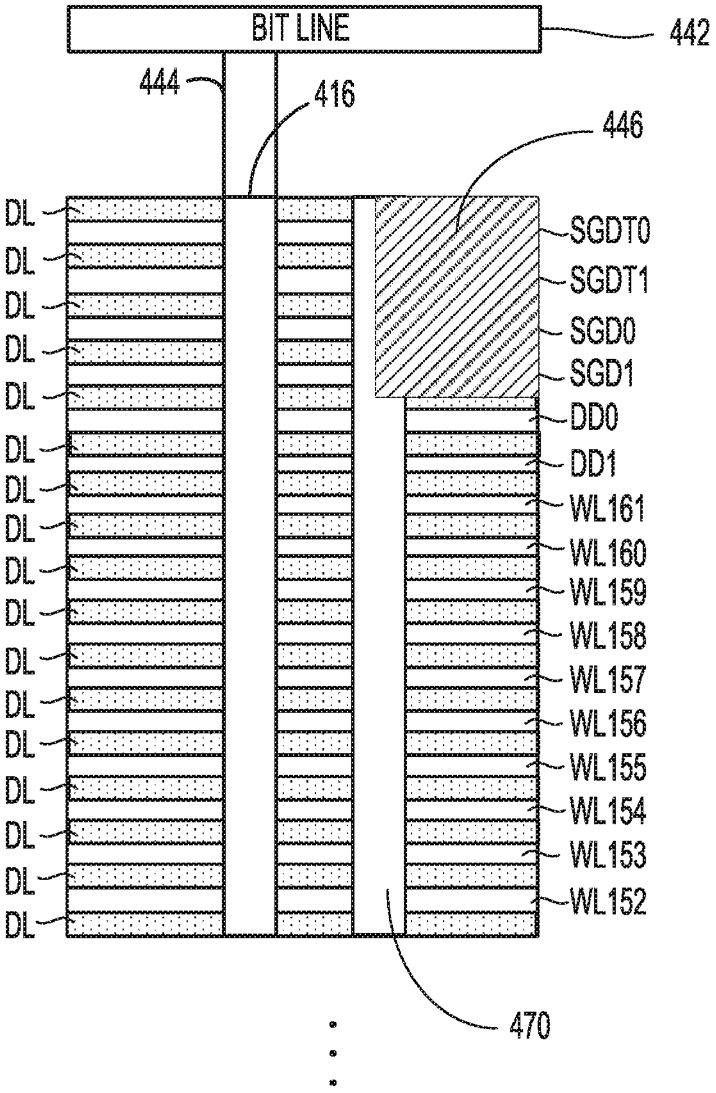
FIG. 4E depicts a cross sectional view of a portion of one embodiment of a block of memory cells.

FIG. 4E depicts a portion of one embodiment of a three dimensional memory structure 202 showing a cross-sectional view along line BB of FIG. 4C. This cross sectional view cuts through memory holes/vertical columns (NAND strings) 416 and 470 of region 454 (see FIG. 4C). FIG. 4E shows the same alternating conductive and dielectric layers as FIG. 4D.

FIG. 4E also shows isolation region 446, which occupies a space that would have been used for a portion of the memory holes/vertical columns/NAND stings, including a space that would have been used for a portion of memory hole/vertical column 470. More specifically, a portion (e.g., half the diameter) of vertical column 470 has been removed in layers SGDT0, SGDT1, SGD0, and SGD1 to accommodate isolation region 446. Thus, while most of the vertical column 470 is cylindrical (has a circular cross section), the portion of vertical column 470 in layers SGDT0, SGDT1, SGD0, and SGD1 has a semi-circular cross section. In one embodiment, after the stack of alternating conductive and dielectric layers is formed, the stack is etched to create space for the isolation region and that space is then filled in with $SiO_2$. This structure allows for separate control of SGDT0, SGDT1, SGD0, and SGD1 for regions 454, 456, 458, 460, and 462 (illustrated in FIG. 4C).

Figure 4F:
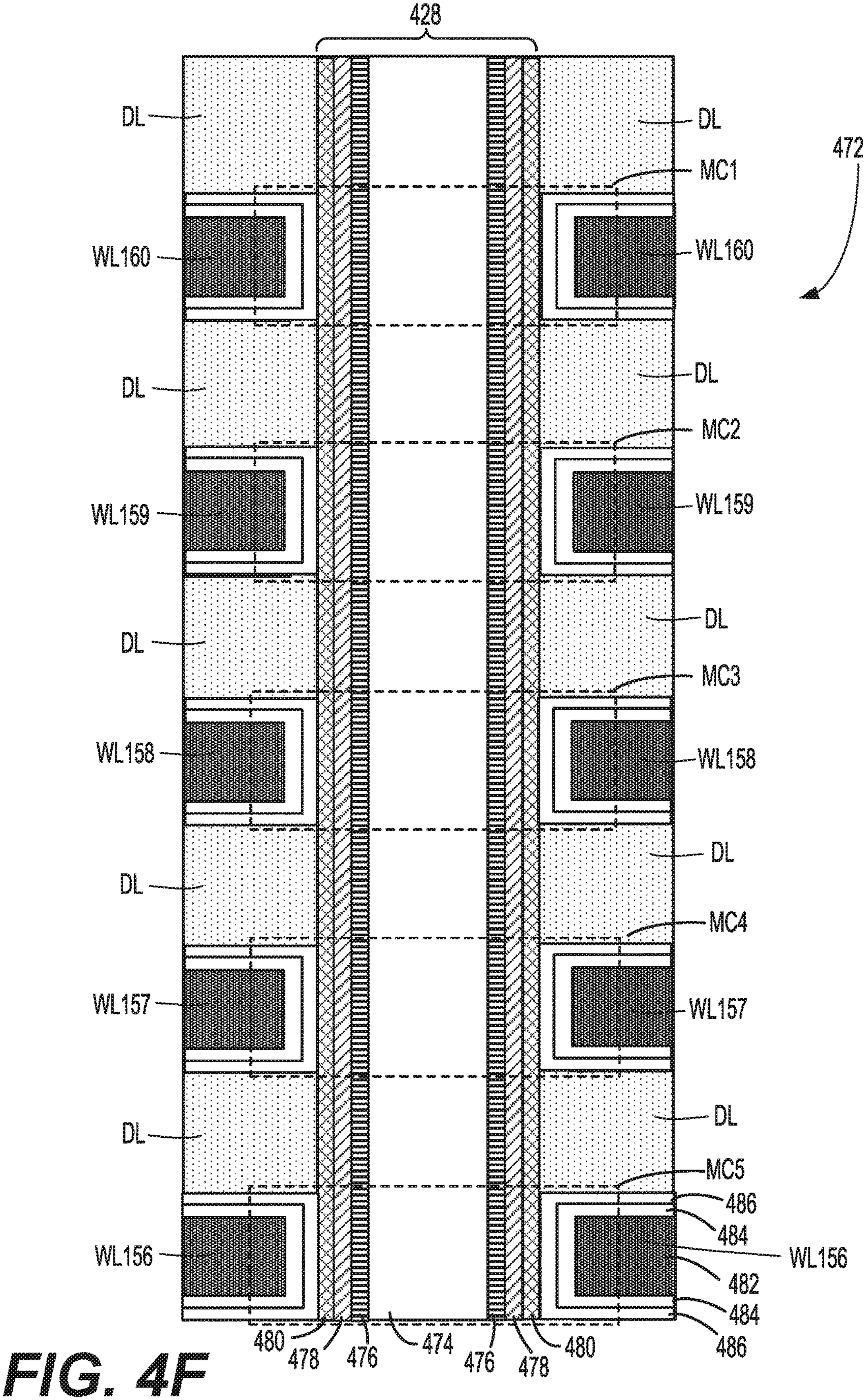
FIG. 4F is a cross sectional view of one embodiment of a vertical column of memory cells.

FIG. 4F depicts a cross sectional view of region 472 of FIG. 4D that includes a portion of memory hole/vertical column 428. In one embodiment, the memory holes/vertical columns are round. However, in other embodiments other shapes can be used. In one embodiment, memory hole/vertical column 428 includes an inner core layer 474 that is made of a dielectric, such as $SiO_2$. Surrounding the inner core 474 is a polysilicon channel 476 (materials other than polysilicon can alternately be used). The channel 476 extends between and is connected with the bit line and the source line. Surrounding the channel 476 is a tunneling dielectric 478 layer, which may have an ONO structure. Surrounding the tunneling dielectric 478 layer is charge trapping layer 480, which may be formed of, for example, Silicon Nitride. It should be appreciated that the technology described herein is not limited to any particular material or structure.

FIG. 4F depicts the dielectric layers DL as well as the word line layers WL160, WL159, WL158, WL157, and WL156. Each of these word line layers includes a word line region 482 surrounded by an aluminum oxide layer 484, which is surrounded by a blocking oxide layer 486. In other embodiments, the blocking oxide layer 486 can be a vertical layer that is parallel with and adjacent to the charge trapping layer 480. The physical interaction of the word line layers with the vertical column forms the memory cells of the NAND string. Thus, in one embodiment a memory cell includes the channel 476, the tunneling dielectric 478, the charge trapping layer 480, the blocking oxide layer 486, the aluminum oxide layer 484, and the word line region 482. For example, word line layer WL160 and a portion of memory hole/vertical column 428 comprise a memory cell MC1. Word line layer WL159 and a portion of memory hole/vertical column 428 comprise a memory cell MC2. Word line layer WL158 and a portion of memory hole/vertical column 428 comprise a memory cell MC3. Word line layer WL157 and a portion of memory hole/vertical column 428 comprise a memory cell MC4. Word line layer WL156 and a portion of memory hole/vertical column 428 comprise a memory cell MC5. In other architectures, a memory cell may have a different structure; however, the memory cell would still be the storage unit.

When a memory cell is programmed, electrons are stored in a portion of the charge trapping layer 480 which is associated with (e.g., in) the memory cell. These electrons are drawn into the charge trapping layer 480 from the channel 476, through the tunneling dielectric 478, in response to an appropriate voltage on word line region 482. The threshold voltage (Vth) of a memory cell is increased in proportion to the amount of stored charge.

In one embodiment, the programming is achieved through Fowler-Nordheim tunneling of the electrons into the charge trapping layer 480. During an erase operation, the electrons return to the channel 476 or holes are injected into the charge trapping layer 480 to recombine with electrons. In one embodiment, erasing is achieved using hole injection into the charge trapping layer 480 via a physical mechanism such as GIDL, as described above.

Figure 4G:
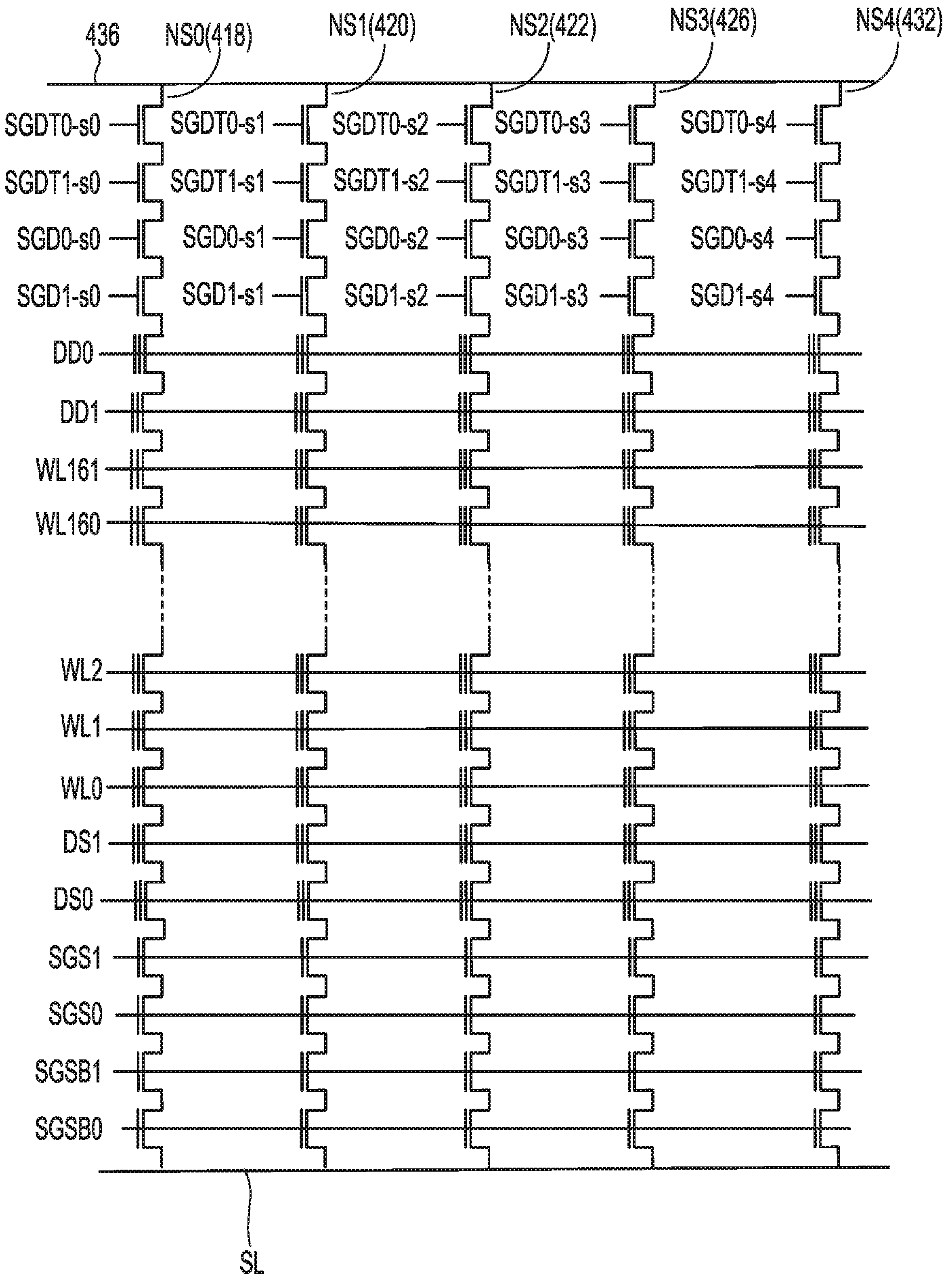
FIG. 4G is a schematic of a plurality of NAND strings in multiple regions of a same block.

FIG. 4G is a schematic diagram of a portion of the three dimensional memory array depicted in in FIGS. 4B-4F. FIG. 4G shows physical data word lines WL0-WL161 running across the entire block. The structure of FIG. 4G corresponds to a portion 412 in Block 2 of FIG. 4B, including bit line 436. Within the block, in one embodiment, each bit line is connected to five NAND strings, one in each region of regions 454, 456, 458, 460, 462 (illustrated in FIG. 4C).

Thus, FIG. 4G shows a bit line 436 connected to NAND string NS0 (which corresponds to memory hole/vertical column 418 of region 454), NAND string NS1 (which corresponds to memory hole/vertical column 420 of region 456), NAND string NS2 (which corresponds to vertical column 422 of region 458), NAND string NS3 (which corresponds to memory hole/vertical column 426 of region 460), and NAND string NS4 (which corresponds to memory hole/vertical column 432 of region 462). The drain side select line/layer SGD0 is separated by isolation regions isolation regions 446, 448, 450 and 452 to form SGD0-*s*0, SGD0-*s*1, SGD0-*s*2, SGD0-*s*3 and SGD0-*s*4 in order to separately connect to and independently control regions 454, 456, 458, 460, 462.

Similarly, the drain side select line/layer SGD1 is separated by isolation regions 446, 448, 450, and 452 (illustrated in FIG. 4C) to form SGD1-*s*0, SGD1-*s*1, SGD1-*s*2, SGD1-*s*3 and SGD1-*s*4 in order to separately connect to and independently control regions 454, 456, 458, 460, 462 (illustrated in FIG. 4C). The drain side GIDL generation transistor control line/layer SGDT0 is also separated by isolation regions 446, 448, 450 and 452 to form SGDT0-*s*0, SGDT0-*s*1, SGDT0-*s*2, SGDT0-*s*3 and SGDT0-*s*4 in order to separately connect to and independently control regions 454, 456, 458, 460, 462. Further, the drain side GIDL generation transistor control line/layer SGDT1 is separated by isolation regions 446, 448, 450 and 452 to form SGDT1-*s*0, SGDT1-*s*1, SGDT1-*s*2, SGDT1-*s*3 and SGDT1-*s*4 in order to separately connect to and independently control regions 454, 456, 458, 460, 462.

FIG. 4G only shows NAND strings connected to bit line 436. However, a full schematic of the block would show every bit line and five vertical NAND strings, which are in separate regions, connected to each bit line.

Although the example memories of FIGS. 4B-4G are three dimensional memory structures that include vertical NAND strings with charge-trapping material, other (2D and 3D) memory structures can also be used with the technology described herein.

As described above, in some machine learning applications, large language models that include a terabyte (or more) of data that must be stored in memory and retrieved at a very high data rate. Such applications, which require very high bandwidth and low power, typically store data in HBM DRAM. For example, in an existing machine learning system application, a processor (e.g., a CPU, GPU or other processor) is coupled to six HBM DRAM devices and has a system bandwidth of 3 TB/s. However, DRAM is very expensive and each DRAM device has limited capacity. Thus, the number of HBM chips needed to store an entire large language model is very costly.

Non-volatile memory (e.g., NAND) is significantly less expensive than DRAM, but the bandwidth of conventional NAND memory devices is much lower than that of HBM DRAM. For example, an HBM DRAM die has a bandwidth of about 75 GB/sec. In contrast, a conventional NAND memory die has a bandwidth of about 4.4 GB/sec.

Achieving a bandwidth of 3 TB/s using conventional NAND memory devices would require a prohibitively large number of memory packages. For example, with 16 memory die per memory package, each memory package has a bandwidth of 16×4.4 GB/s=70.4 GB/s. To provide a bandwidth of 3 TB/sec, 44 memory packages would be required, which is not practical.

The present disclosure is related to operating techniques that increase the bandwidth of a non-volatile memory device for the purpose of producing a high bandwidth flash (HBF) memory device that may be used as a replacement for HBM, particularly for machine learning inferencing operations. The HBF memory devices of the present disclosure are configured to be operated according to a 1 bit per memory cell (sometimes referred to as “single level cell” or “SLC” memory) storage scheme. The SLC storage scheme (as opposed to other storage schemes that allow multiple bits to be stored in each memory cell), is chosen because it is the fastest solution for reducing read latency (and increasing bandwidth).

Figure 5:
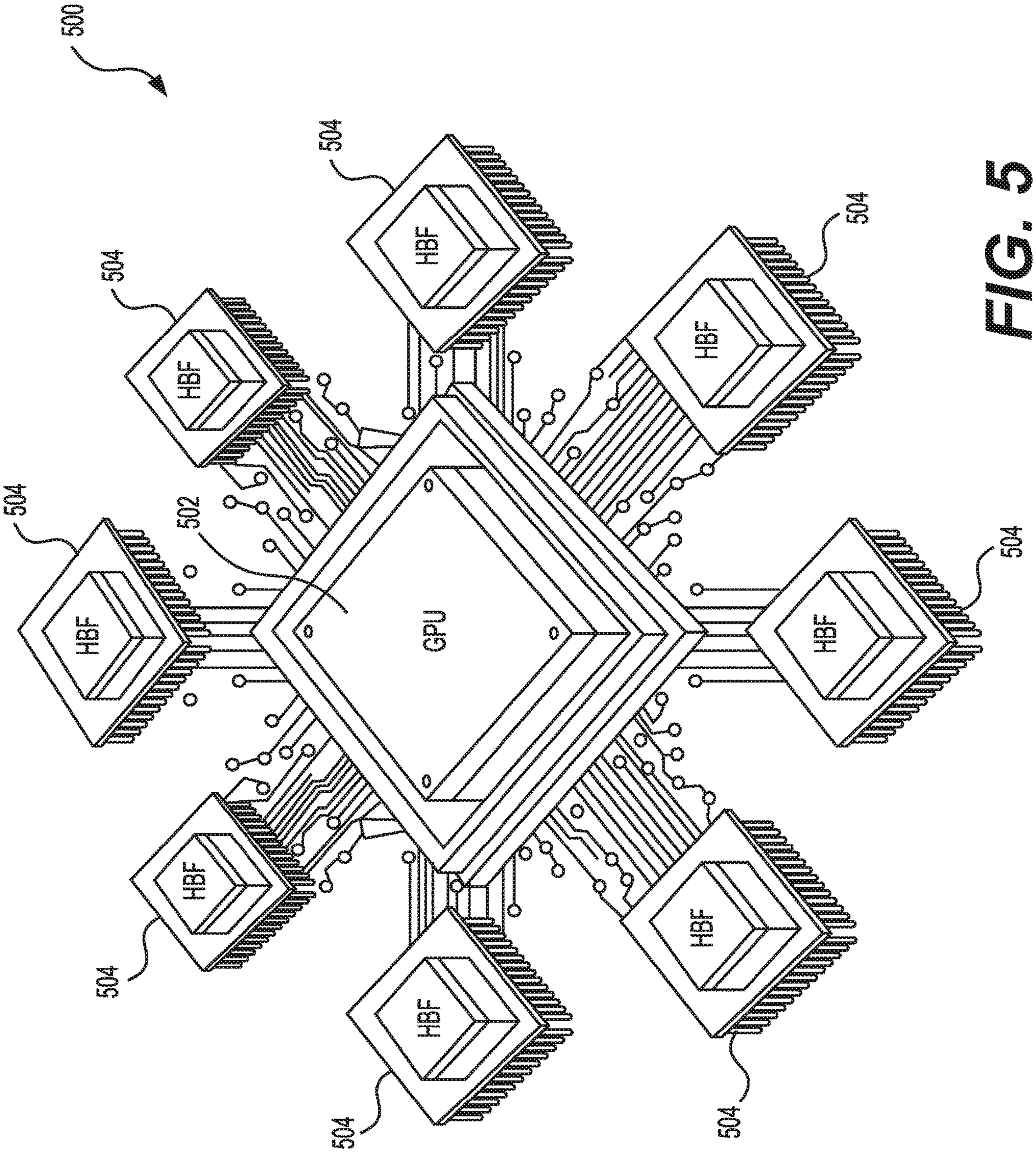
FIG. 5 is a perspective view illustrating an example embodiment of a computing system that includes a plurality of high bandwidth flash units constructed according to an exemplary embodiment of the present disclosure.

FIG. 5 illustrates an example embodiment of a computing system 500 constructed according to aspects of the present disclosure. The computing system 500 includes a single graphics processor unit (GPU) 502 (or any suitable processor unit) and eight HBF packages 504, which are all in electrical communication with the single GPU 502. Such a computing system 500 may be particularly adapted for use in storing data pertaining to a large language mode because once the model data have been stored in the HBF packages 504, the model data are not updated or changed very often. Thus, for a machine learning inferencing application, the HBF packages 504 can be considered write once, read many times memory. In some embodiments, the computing system 500 can include more or fewer than eight HBF packages 504. For example, in another embodiment, the computing system includes five HBF packages that are in electrical communication with a single GPU.

In an exemplary embodiment, each of the HBF units 504 includes eight memory dies, each of which includes thirty-two planes that can be independently and simultaneously be operated on. In some embodiments, the number of dies in each HBF unit and the number of planes per die can vary from these figures.

Figure 6:
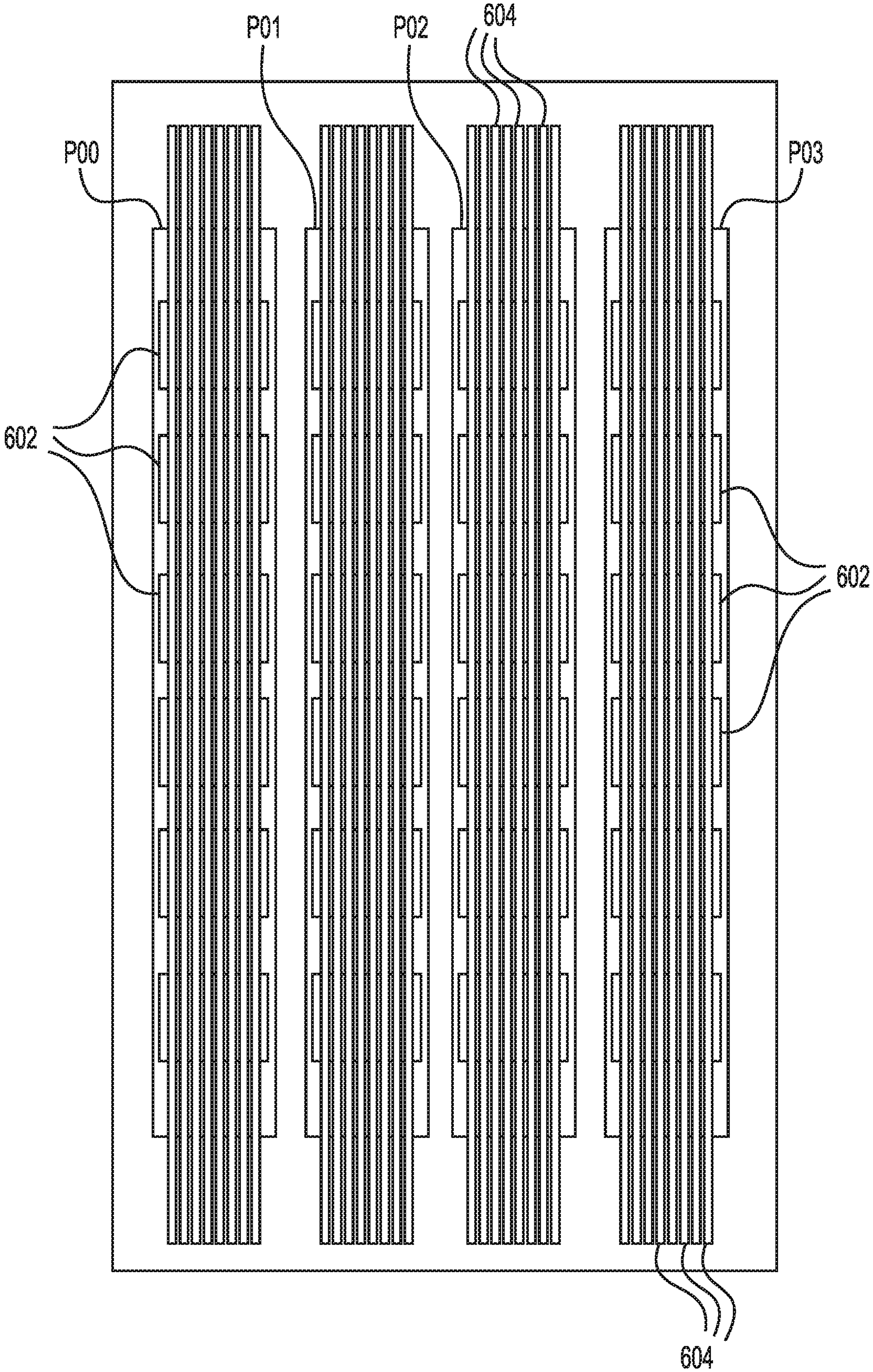
FIG. 6 is a schematic view of a die of an exemplary embodiment that includes a plurality of planes with a plurality of memory blocks.

As described above, a memory die or structure 600 (such as memory structure 202 of FIG. 2A) may include multiple planes that can all operate in parallel with one another. For simplicity purposes, four planes (P00, P01, P02, and P03) are illustrated in the schematic diagram of FIG. 6. Each of the planes includes a plurality of memory blocks 602 that share a common set of bit lines 604 with the bit lines extending across all of the memory blocks 602 of the respective plane, i.e., one set of bit lines 604 per plane. Because the memory blocks 602 of a plane share a common set of bit lines 604, within each plane, only a single one of the memory blocks 602 can be operated on at a time. However, memory blocks 602 of different planes can be operated in parallel (at the same time as one another).

Figure 7:
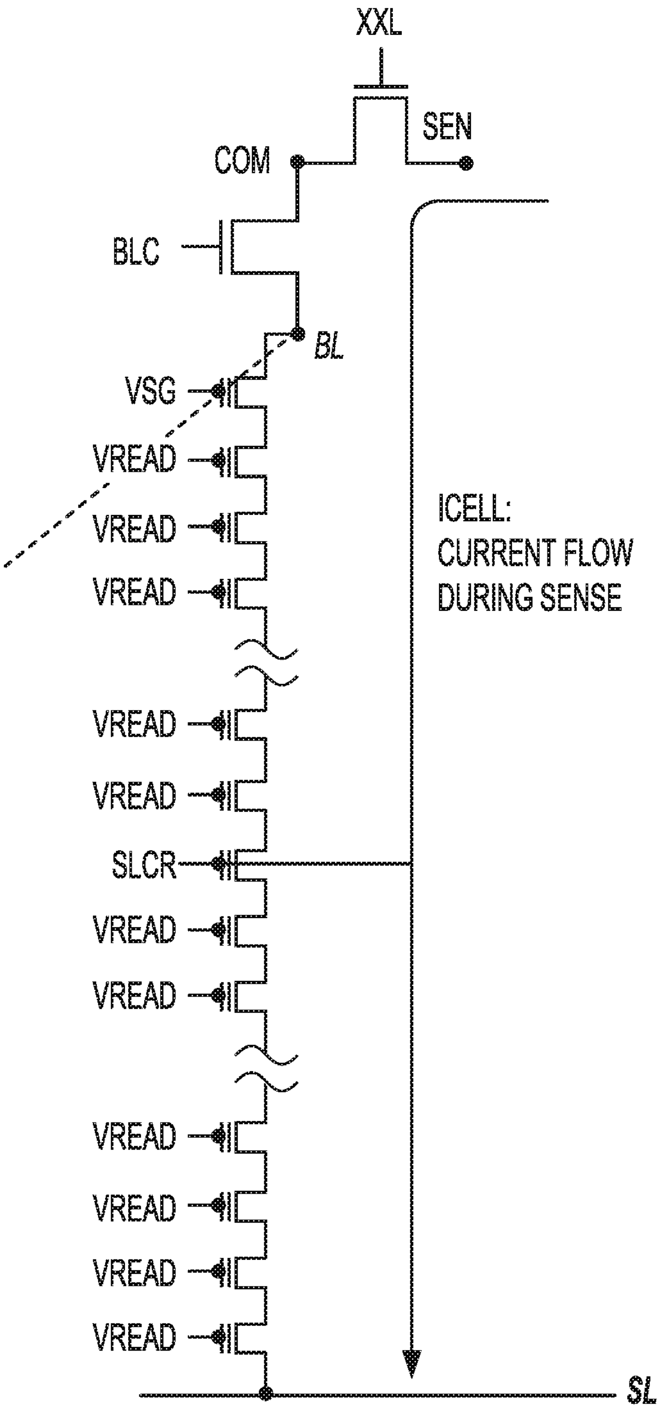
FIG. 7 is a schematic view of an exemplary NAND string during a sensing operation.
Figure 8:
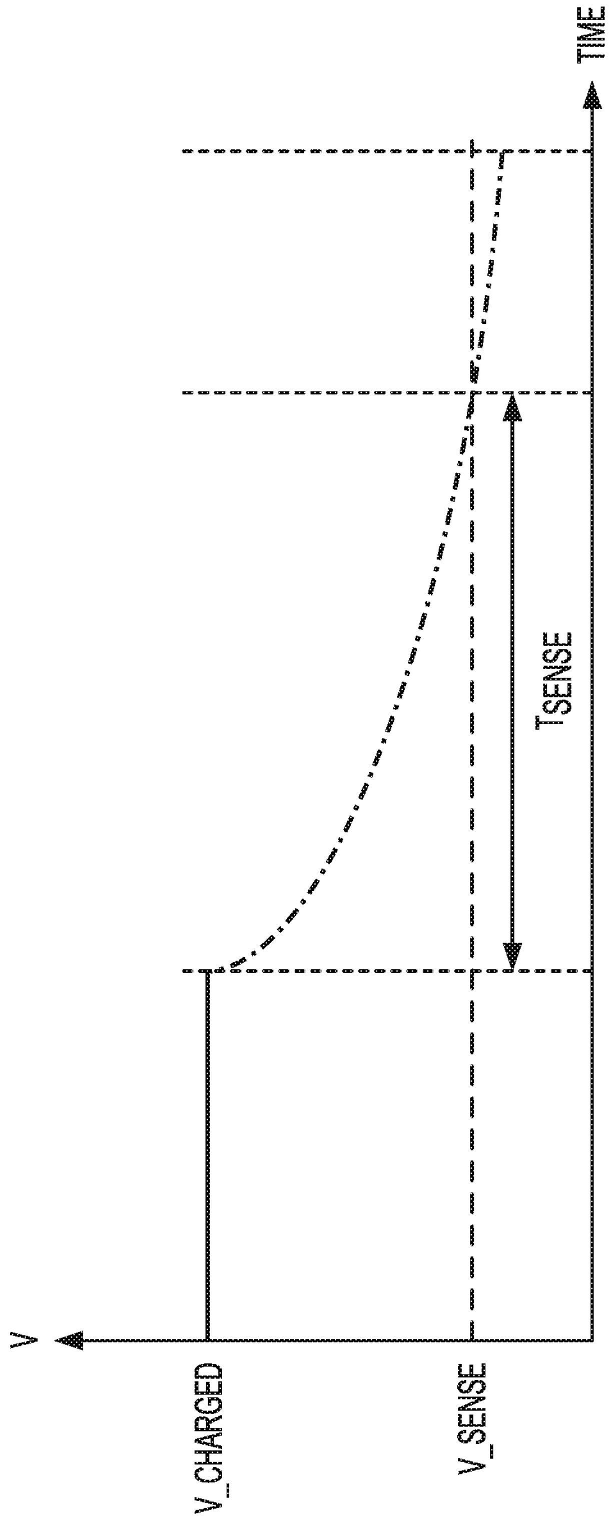
FIG. 8 is a plot of voltage at a sense node versus time during an exemplary sensing (read) operation.

In a sensing operation, which is schematically illustrated in FIGS. 7 and 8, during a sensing operation (verify or read), a sense node SEN on the drain side of the memory block is charged to a predetermined charged voltage. Simultaneously, all of the memory cells of the NAND string except the memory cell of the selected word line WLn are turned on by a pass voltage VREAD. A reference voltage SLCR is applied to a control gate of the selected word line WLn. The sense node SEN is then discharged through the NAND string by way of the appropriate bit line BL. Since all of the memory cells in the NAND string except the one of the selected word line WLn are turned on by the pass voltage VREAD, the discharge current Icell through the NAND string is largely dictated by the threshold voltage Vt of the memory cell being sensed. More specifically, the discharge current Icell is largely dictated by whether the threshold voltage Vt of a memory cell being sensed is greater or less than the reference voltage SLCR. At a discharge time T_sense, a voltage on the SEN node is sensed by the sensing circuitry and compared to V_sense, which is the threshold voltage Vt of the ΔVPGM sensing transistor. If the threshold voltage Vt of the memory cell being sensed is higher than the reference voltage SLCR, then the memory cell is "off" and conducts a very small/negligible current resulting in only a small discharge of SEN node voltage, thereby maintaining higher voltage on the SEN node compared to V_sense. This indicates that the threshold voltage Vt of the memory cell is higher than the reference voltage SLCR. On the other hand, if the threshold voltage Vt of the memory cell being sensed is lower than the reference voltage SLCR, then the memory cell is "on" and conducts a larger discharging current resulting in the SEN node bias being lower than V_sense, thereby indicating that the threshold voltage Vt of the memory cell being sensed is lower than the reference voltage SLCR.

Figure 9:
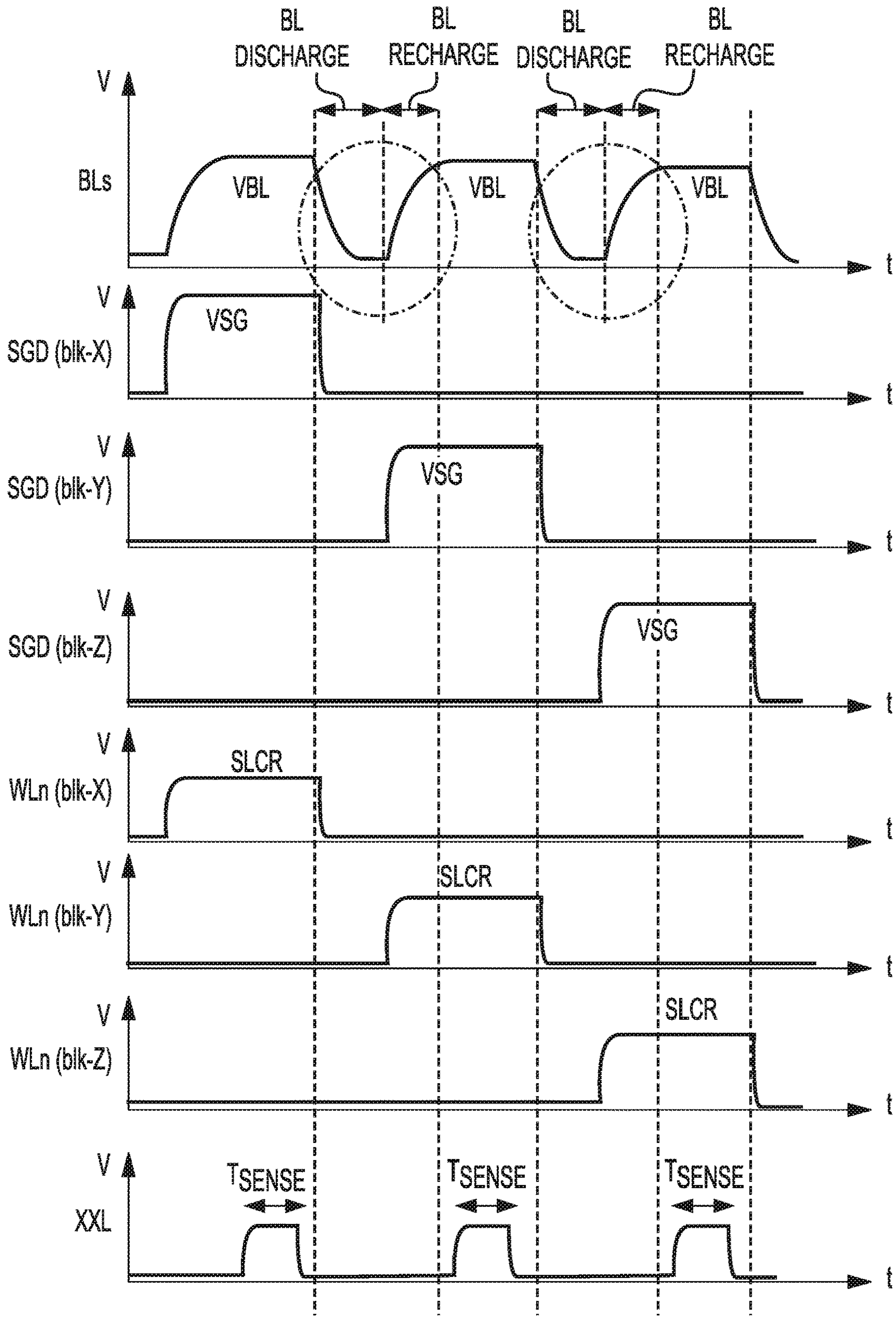
FIG. 9 illustrates the voltage waveforms of the voltages applied to a plurality of different components of an exemplary memory device according to one read technique.

Turning back to FIG. 6, because all of the memory blocks in a plane share the same set of bit lines, only one of the memory blocks in a plane can be operated at a time. FIG. 9 illustrates an example technique for reading data from selected word lines WLn of three different memory blocks (blk-X, blk-Y, blk-Z) that are all located in the same plane, one after the other. During each read, the bit lines BLs are ramped to VBL and the appropriate SGD and word line WL are ramped to their respective voltages VSG and SLCR. Once the sensing operation of one block is completed, then the bit lines BL, the SGD, and the word line WL are all discharged to a very low voltage, e.g., 0 V or approximately 0 V. Next, the bit lines are ramped back up to VBL and the next block's SGD and selected word line WL are ramped to VSG and SLCR respectively. This process is repeated over and over, and all of these steps contribute to read time tRead.

The present disclosure is related to techniques to improve read performance (reduce tRead). According to these techniques, the bit lines of a plane do not ramp down to the very low voltage in between read operations but rather remain elevated during and between read operations with only a brief bit line settling time between read operations. Also according to techniques, the bit line settling time is improved including in a memory plane alternating "dummy" (inactive) bit lines in alternating fashion with active bit lines. Both of these techniques are discussed in further detail below.

By leaving the bit lines at VBL between read operations, the times required to discharge and ramp-up the bit lines are eliminated, thereby improving read performance (reducing tRead). Even if one read operation is completed and there is not a subsequent read instruction, the bit lines do not ramp back down to approximately 0 V but rather are held at VBL indefinitely to improve read performance when the next read instructions is received. In an example embodiment, VBL is set at approximately 0.2 V, and the voltages of the bit lines BLs never fall by more than 25% from VBL during or between read operations. For example, in the embodiment where VBL is set at 0.2 V, the voltages of the bit lines BLs never dip below 0.15 V (75% if VBL).

Figure 10:
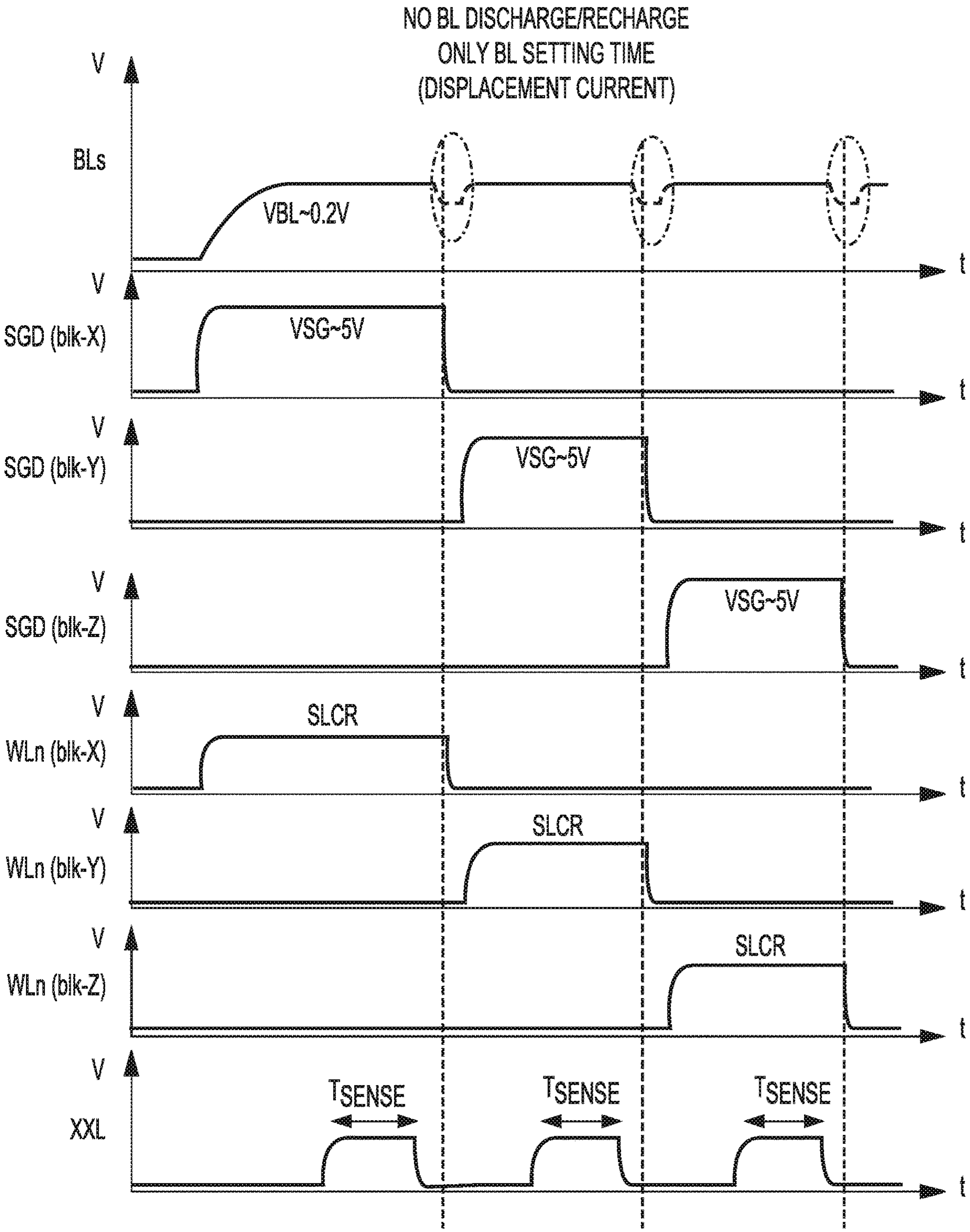
FIG. 10 illustrates the voltage waveforms of the voltages applied to a plurality of different components of an exemplary memory device according to a read technique of an aspect of the present disclosure.

FIG. 10 depicts the voltages applied to various components of a plane according to an example embodiment. As illustrated, following each read operation (3 being illustrated), there is only a brief settling time (for example, less than 1 microseconds) to let the bit lines BLs settle back at VBL (no ramp down or ramp up of the bit lines BLs) before ramp up begins of the SGD and the selected word line WLn in the next memory block. In this example, the first read operation is performed on the memory cells of a selected word line WLn of a first block (blk-X). The bit lines BLs are ramped up from approximately 0 V to VBL, and the appropriate SGD and selected word line WLn of the first block blk-X are ramped up to VSG and the reference voltage SLCR respectively. The sensing operation is then performed to compare the threshold voltages of a plurality of memory cells in the selected word line WLn to the reference voltage SLCR, and then the appropriate SGD and selected word line WLn of the first block blk-X are ramped down to approximately 0 V without also ramping down the bit lines BLs. Nearly immediately after the SGD and the selected word line WLn of the first block blk-X begin to ramp down, the SGD and a selected word line in the second block (blk-Y) begin to ramp up to VSG and SLCR respectively. Because the bit lines BLs do not have to ramp down and then ramp up, the time between ramping down the SGD and selected word line WLn of the first block blk-X and ramping up the SGD and selected word line WLn of the second block blk-Y is significantly reduced as compared to the process illustrated in FIG. 9. The sensing operation is then performed on the second block blk-Y. Next, this process is repeated to ramp down the SGD and selected word line WLn of the second block blk-Y and ramp up the SGD and selected word line WLn of the third block (blk-Z), again without ramping down the bit lines BLs. It should be appreciated that the order that the blocks are read from could vary among the many blocks (e.g., thirty-two blocks) in a single plane. The read operation can also be performed on any of the blocks in the plane back-to-back. This process can continue indefinitely through as many read operations as needed without ramping down the voltages applied to the bit lines from VBL. As such, the bit lines can be considered to be "always on."

Figure 11:
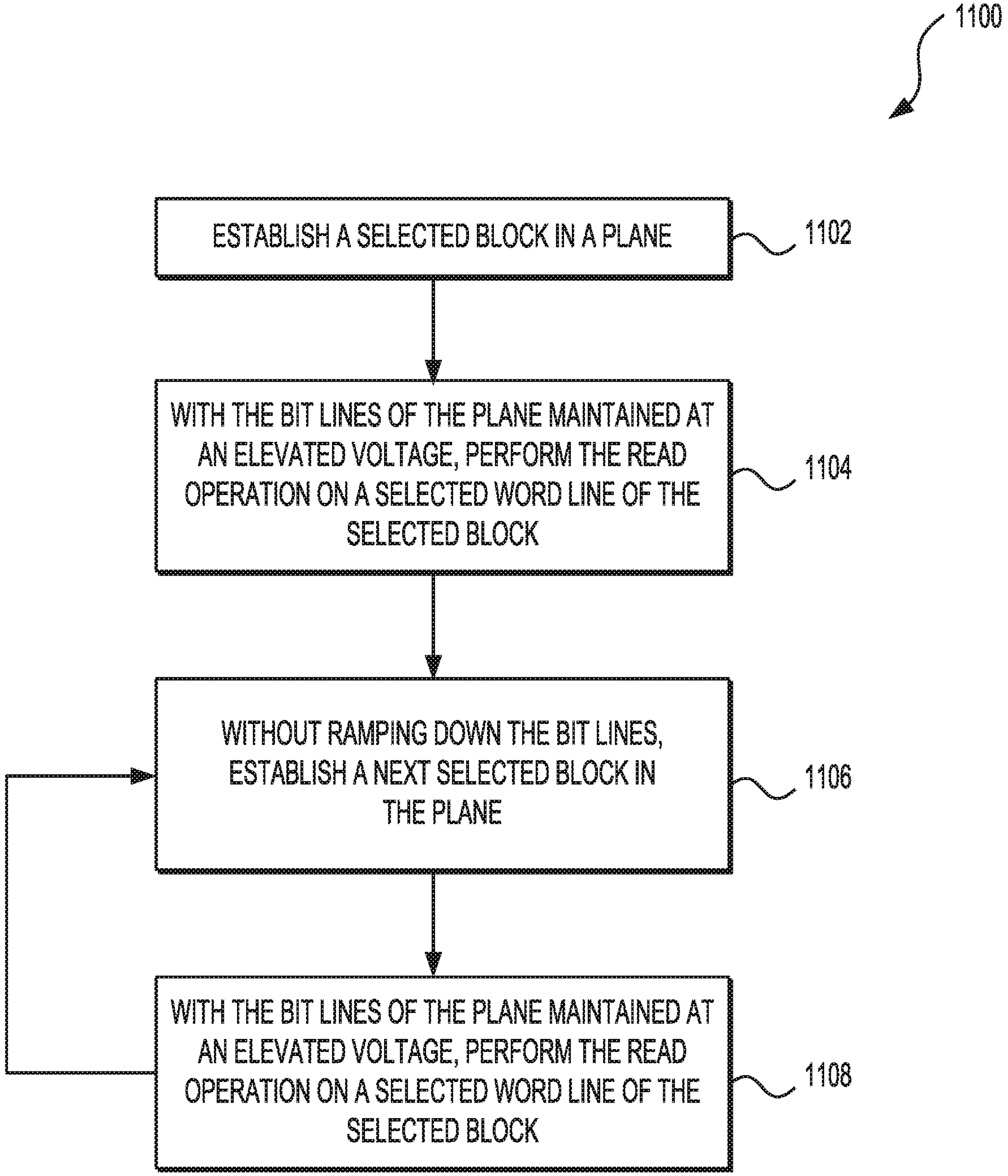
FIG. 11 is a flow chart depicting the steps of performing a plurality of read operations according to an exemplary embodiment of the present disclosure.

FIG. 11 includes a flow chart 1100 which depicts the steps of performing a sensing operation in a memory device according to an exemplary embodiment of the present disclosure. These steps could be performed by the controller; a processor or processing device or any other control circuitry, executing instructions stored in memory; and/or other circuitry described herein that is specifically configured/programmed to execute the following steps.

At step 1102, the control circuitry establishes a selected block of a plurality of blocks in a plane. The plurality of blocks share (are in electrical connection or communication with) a common set of bit lines. The selected block includes a selected word line WLn that contains memory cells with data which is to be read. At step 1104, with the bit lines of the plane being maintained at an elevated voltage VBL (a first voltage), which is greater than approximately zero Volts, the control circuitry performs a read operation on the selected word line WLn.

At step 1106, without ramping down the bit lines of the plane, the control circuitry establishes a next selected block in the plane. The next selected block can be the same block that contained the selected word line WLn which was read in step 1104 or it can be another of the plurality of blocks in the plane. At step 1108, with the bit lines of the plane being maintained at the elevated voltage VBL, the control circuitry performs a read operation on a selected word line WLn of the selected block. The process then returns to step 1106 and continues through the loop of steps 1106 and 1108 indefinitely without ramping down the bit lines from the elevated voltage VBL to approximately zero Volts.

Turning back to FIG. 4C, the set of bit lines 434 can all be active with each NAND string/memory hole 416, 418, 420, 422, 424, 426, 428, 430, 432 being in electrical communication with at least one of the bit lines 436, 438, 440, 444. Further, although not illustrated in this figure, in this example, all of the bit lines 436, 438, 440, 442, 444 are in electrical communication with respective sense amplifiers SAs, which are active during the aforementioned sensing operation to amplify otherwise small voltage swings in the respective bit lines 436, 438, 440, 442, 444 during sensing operations, such as read operations. Thus, in this example, all of the NAND strings/memory holes 416, 418, 420, 422, 424, 426, 428, 430, 432 are active in that they contain memory cells that can be programmed, erased, and read.

Figure 12:
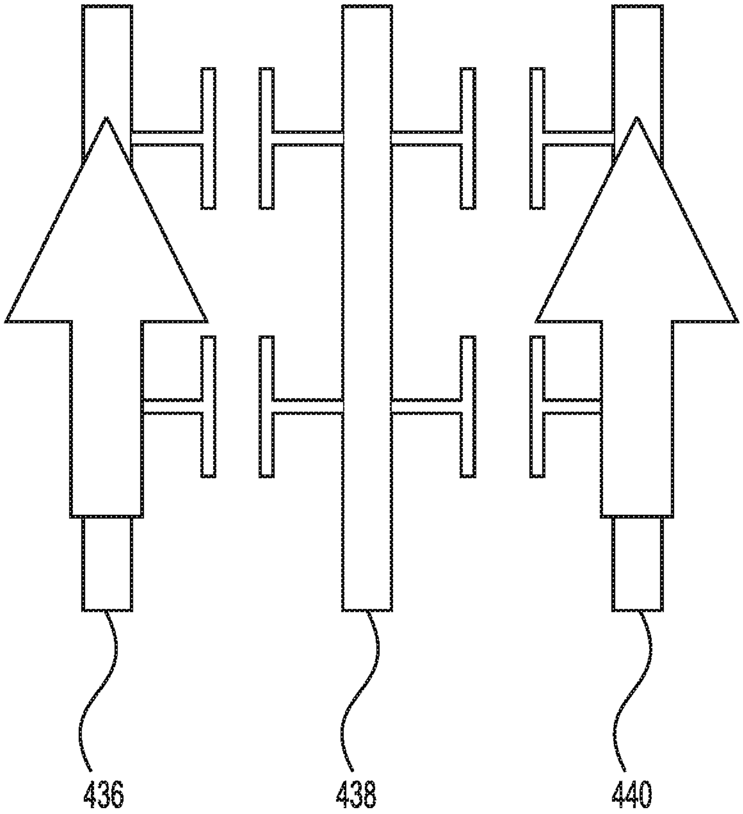
FIG. 12 is a schematic view of a plurality of bit lines during a read operation with only two of the bit lines conducting current.

In any given read operation, any of the bit lines 436, 438, 440, 442, 444 can either be conducting or non-conducting. As illustrated in FIG. 12, when the first voltage VBL is applied to one of the bit lines 438 during a read operation and one or both of the adjacent bit lines 436, 440 is/are conducting, current in the adjacent bit line(s) 436, 440 will create a capacitance between the target bit line 438 and the conducting adjacent bit line 436, 440 because these bit lines 436, 438, 440 are so close to one another. This capacitive coupling can induce an unintended voltage drop in the targeted bit line 438, thereby reducing the voltage seen at the target bit line 438 (from the first voltage VBL to something slightly less than the first voltage VBL) during the read operation. The target bit line 438 then must return to (settle at) the first voltage VBL during the aforementioned brief bit line settling time between read operations before the next read operation can begin. The exemplary embodiments discussed below further reduce this already brief bit line settling time to further improve read performance.

Figure 13A:
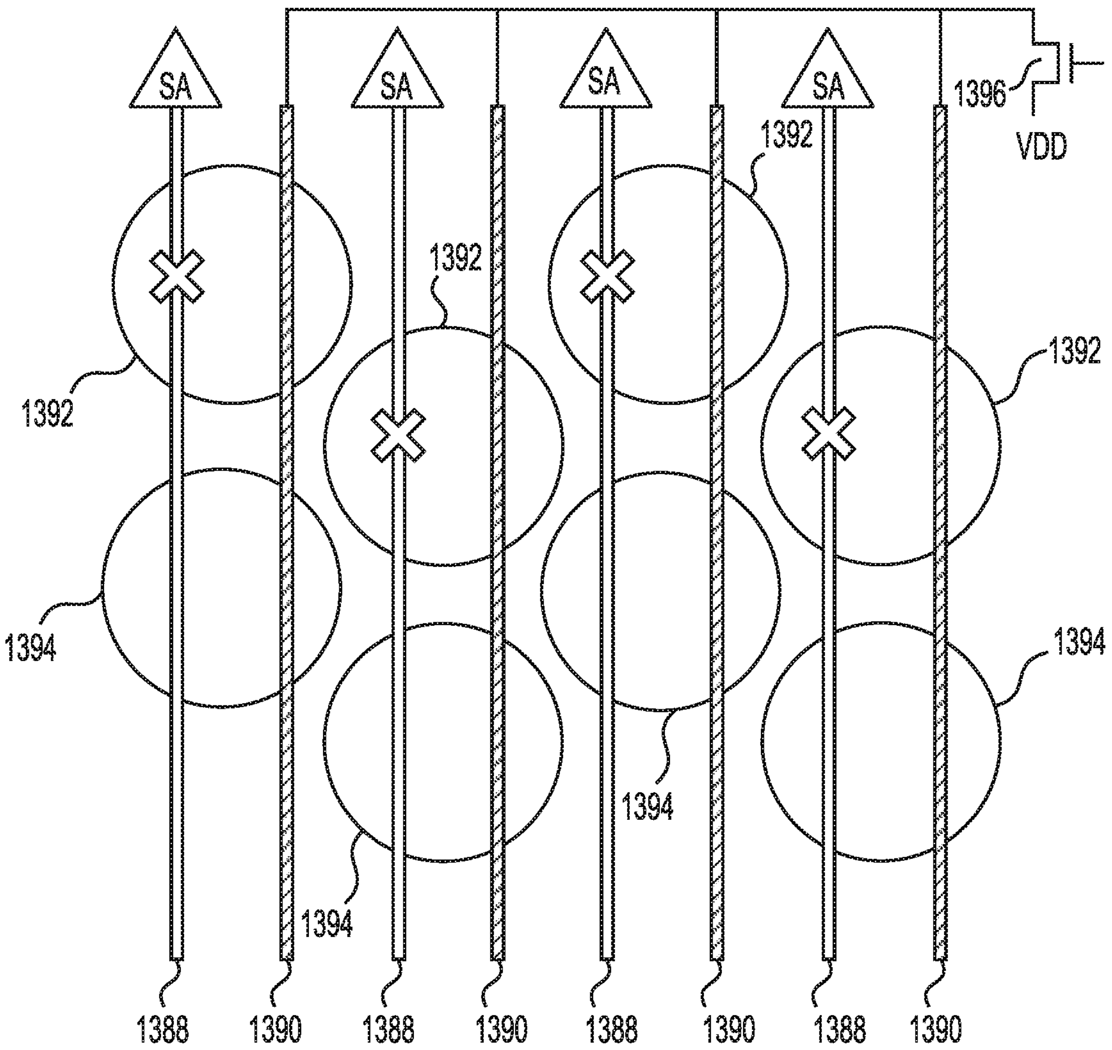
FIG. 13A is an overhead and schematic view illustrating the connections of a plurality of bit lines to a plurality of memory holes according to an exemplary embodiment of the present disclosure.

Turning now to FIG. 13A, in an exemplary embodiment, a set of bit lines for a plane includes alternating active bit lines 1388, which are electrically connected with respective sense amplifiers SAs and active memory holes, and inactive (dummy) bit lines 1390, which are not electrically connected with sense amplifiers SAs or active memory holes. More specifically, all of the bit lines 1388, 1390 of the set extend at least partially in parallel relationship with one another and the bit lines 1388, 1390 are arranged such that active bit lines 1388 and inactive bit lines 1390 alternate from one side of the set to an opposite side, i.e., active bit line 1388, inactive bit line 1390, active bit line 1388, inactive bit line 1390, and so on. At least one inactive bit line 1390 separates each pair of adjacent active bit lines 1388 such that no two active bit lines 1388 are immediately adjacent one another. Because half of the bit lines 1388, 1390 are inactive bit lines 1390, a corresponding half of memory holes (NAND strings) 1392, 1394, as well as the memory cells contained in those memory holes, are inactive memory holes 1394. Accordingly, half of the memory cells in the memory block are inactive (dummy memory cells) and cannot contain data. The other half of the memory holes 1392, 1394 are active memory holes 1392. In this example embodiment, every other row of memory holes 1392, 1394 contains active memory holes 1392 and every other row of memory holes 1392, 1394 contains inactive memory holes 1394. Accordingly, the memory block of the embodiment FIG. 13A has only half the data storage capacity of a memory block where all of the memory holes are active.

Figure 13B:
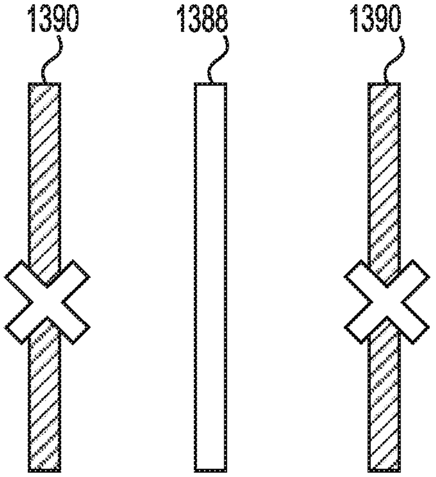
FIG. 13B is a schematic view illustrating a plurality of bit lines including two inactive bit lines and a single active bit line and illustrating that there is no capacitive coupling between these three bit lines.

Although the inactive bit lines 1390 are not connected to sense amplifiers SAs and do not conduct current during read operations, they are electrically connected with one or more charge pumps and are maintained at a second voltage during and between read operations. In a presently preferred embodiment, the second voltage is similar to the first voltage, e.g., 0.2 V. However, in some other embodiments, the first and second voltages can be different. As illustrated in FIG. 13B, there is very little or no capacitive coupling between the inactive bit lines 1390 and the illustrated active bit line 1388, and thus, there is very little or no voltage fluctuation in the target active bit line 1388 caused by capacitive coupling. In other words, the voltage at the target active bit line 1388 does not fall due to capacitive coupling during or between read operations. The same occurs for all other active bit lines 1388 that conduct current during any given read operation. Since the voltages at the active bit lines 1388 do not fall due to capacitive coupling during read operations, the bit line settling time between read operations can be greatly reduced, thereby further improving read performance (reducing tRead).

In the exemplary embodiment of FIGS. 13A and 13B, all of the inactive bit lines 1390 are maintained at the first voltage VBL by a single voltage source that is connected to a single transistor 1396.

Figure 14:
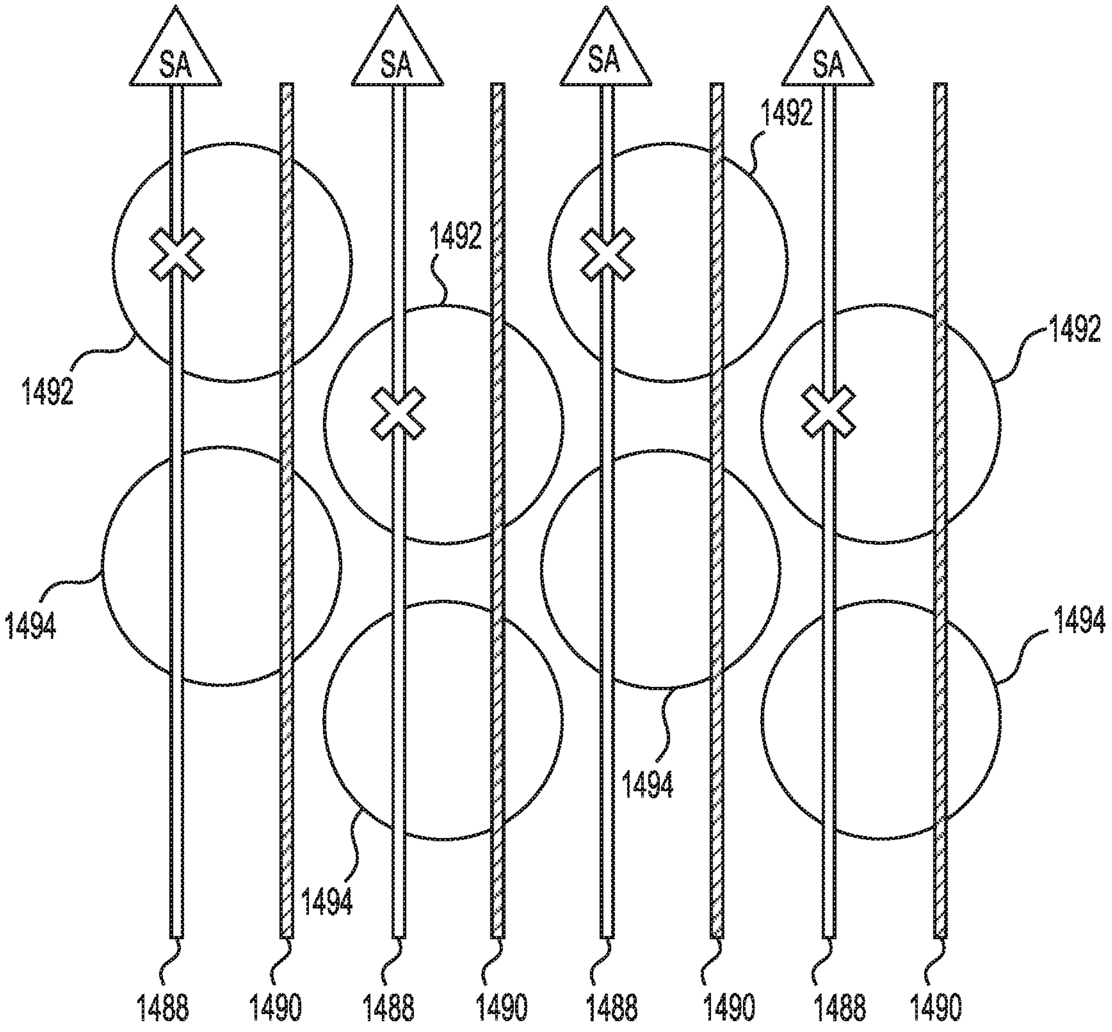
FIG. 14 is an overhead and schematic view illustrating the connections of a plurality of bit lines to a plurality of memory holes according to another exemplary embodiment of the present disclosure.

Turning now to FIG. 14, another exemplary embodiment of a memory block with a plurality of active bit lines 1488 and a plurality of inactive bit lines 1490 is depicted with like numerals, separated by a prefix of "14," identifying like components with the above-referenced embodiments. In this embodiment, rather than being maintained at the second voltage, the inactive bit lines are electrically floated, i.e., electrically isolated from one another and not electrically connected with an active voltage source. By having the inactive bit lines 1490 electrically float, capacitive coupling between each active bit line 1488 and its neighboring inactive bit lines 1490 is reduced. The reduced capacitive coupling reduces settling time between read operations and improves read performance (reduces tRead).

Figure 15:
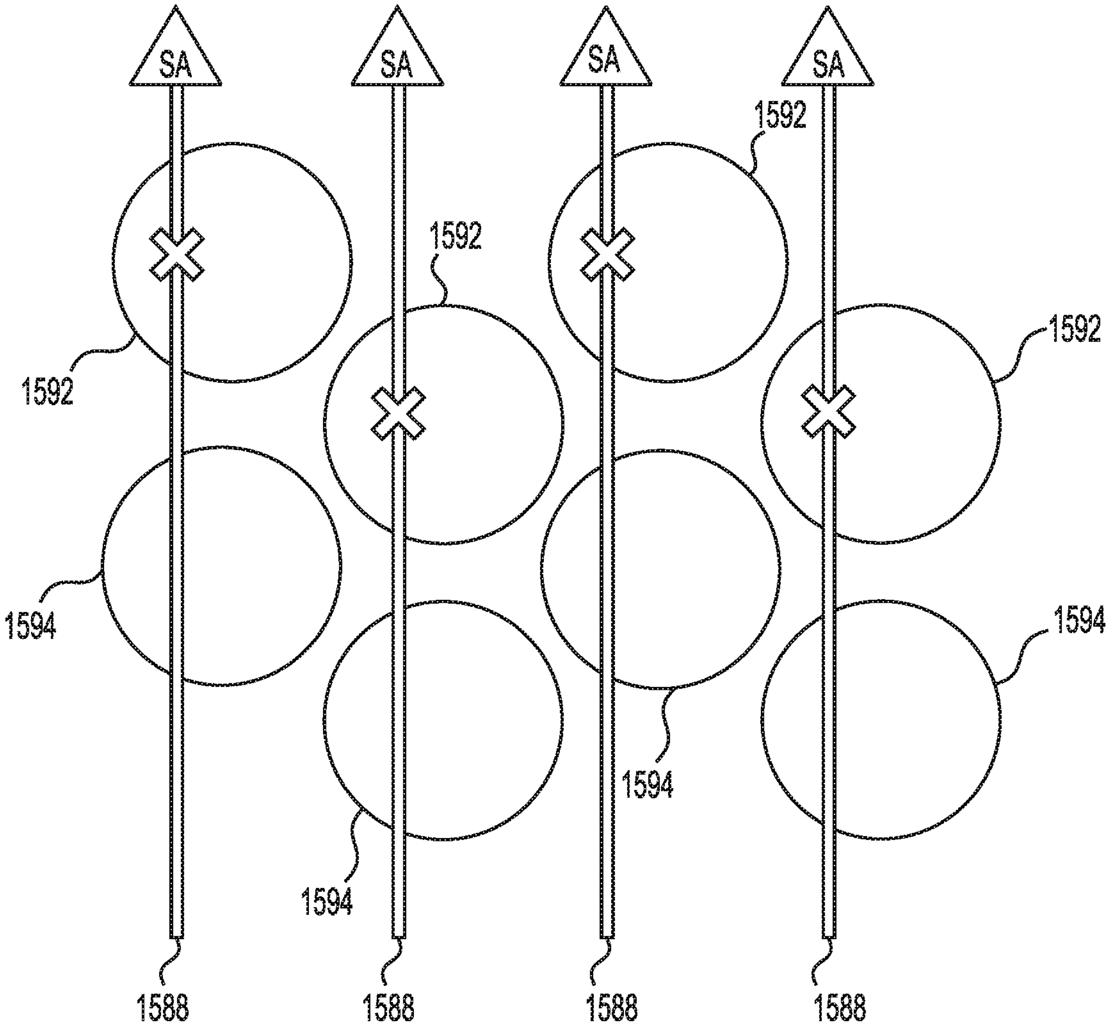
FIG. 15 is an overhead and schematic view illustrating the connections of a plurality of bit lines to a plurality of memory holes according to yet another exemplary embodiment of the present disclosure.

Turning now to FIG. 15, yet another example embodiment of a memory block is depicted with like numerals, separated by a prefix of "15," identifying like components with the above-referenced embodiments. In this embodiment, there are no inactive bit lines as is the case in the embodiments of FIGS. 13 and 14, but rather, the space between active bit lines 1588 has been increased. More specifically, in the exemplary embodiment, the spacing between active bit lines has been doubled. As with the above-discussed embodiments, half of the memory holes are not connected to active bit lines and are inactive memory holes 1594 themselves. Thus, while this embodiment does not include inactive bit lines, the data capacity is still halved as compared to the embodiment of FIG. 4C. In this embodiment, the increased spacing decreases any capacitive coupling between adjacent active bit lines 1588. Accordingly, voltage fluctuations in each active bit line 1588 are reduced and the settling time is improved (i.e., tRead is reduced) as compared to memory devices where the bit lines are more closely spaced from one another. In an exemplary embodiment, the spacing between adjacent active bit lines is at least 30 nm.

Figure 16:
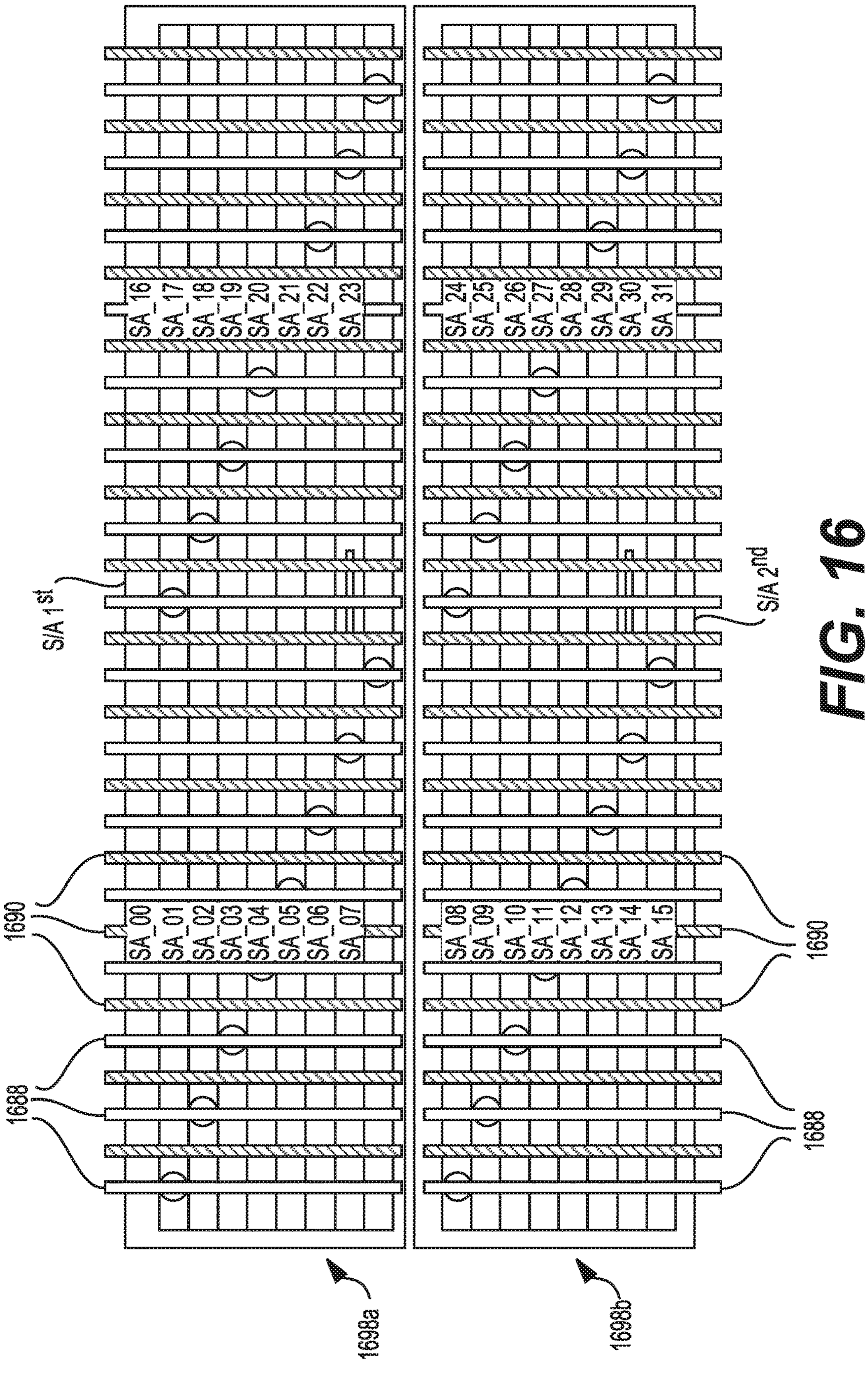
FIG. 16 is a schematic view illustrating a memory block with a pair of sense amplifiers located in two areas and with a plurality of active bit lines and a plurality of inactive bit lines.

In a memory die, the sense amplifiers SA typically require a lot of space or real estate. Since the planes of the three embodiments described above require fewer (half) the number of sense amplifiers, the real estate occupied by the sense amplifiers SAs can be reduced considerably and that real estate can be given to other components. Turning now to FIG. 16, where like numerals separated by a prefix of "16" identify like numerals with the embodiments discussed above, the sense amplifier area can be divided into two sub-sense amplifier areas 1698*a*, 1698*b*, and the same number of sense amplifiers SAs can be attached to two different sets of bit lines 1688, 1690. For example, in this exemplary embodiment, each set of bit lines includes thirty-two (32) bit lines 1688, 1690, of which sixteen (16) are active bit lines 1688 and sixteen (16) are inactive bit lines 1690. A sense amplifier area that includes thirty two (32) sense amplifiers SAs can thus be electrically connected with the active bit lines 1688 of two such sets of bit lines (i.e., the sixteen active bit lines 1690 in each set). Accordingly, although the capacity of each memory block and each plane has been reduced by half in comparison to other memory devices since half of the memory cells are inactive, the bandwidth of each sense amplifier area is maintained.

Figure 17:
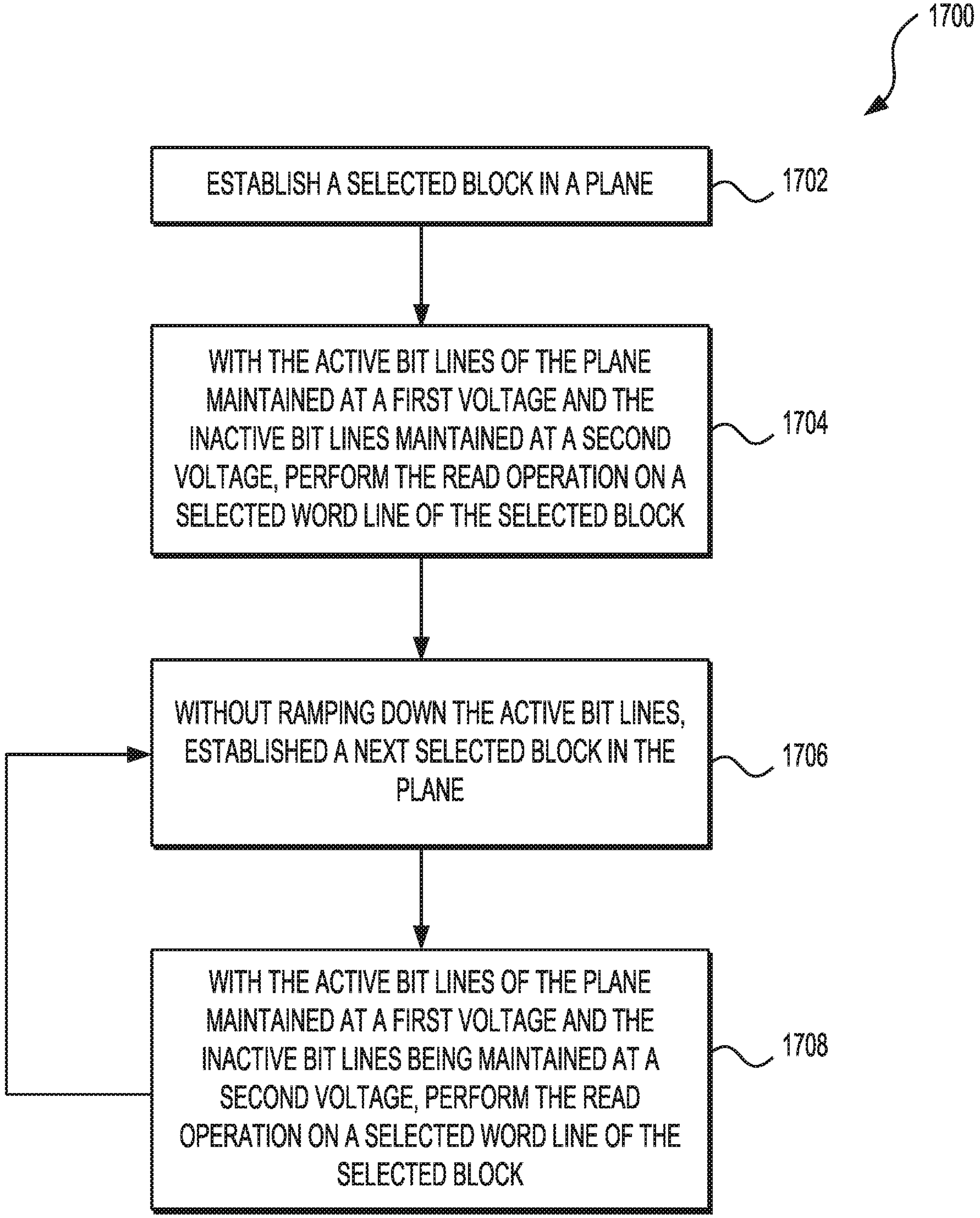
FIG. 17 is a flow chart depicting the steps of performing a plurality of read operations in a memory device according to another exemplary embodiment of the present disclosure.

FIG. 17 includes a flow chart 1700 which depicts the steps of performing a sensing operation in a memory device according to an exemplary embodiment of the present disclosure. These steps could be performed by the controller; a processor or processing device or any other control circuitry, executing instructions stored in memory; and/or other circuitry described herein that is specifically configured/programmed to execute the following steps.

At step 1702, the control circuitry establishes a selected block of a plurality of blocks in a plane. The plurality of blocks share (are in electrical connection or communication with) a common set of bit lines, which includes a plurality of active bit lines and a plurality of inactive bit lines. The selected block includes a selected word line WLn that contains memory cells with data which is to be read and also contains inactive memory cells that do not contain data. At step 1704, with the active bit lines of the plane being maintained at a first voltage VBL, which is greater than approximately zero Volts and the inactive bit lines being maintained at a second voltage, the control circuitry performs a read operation on the selected word line WLn. The first and second voltages can be similar or different from one another, but even if the first and second voltages are similar, the active and inactive bit lines are not supplied these voltages by the same voltage source.

At step 1706, without ramping down the active bit lines of the plane, the control circuitry establishes a next selected block in the plane. The next selected block can be the same block that contained the selected word line WLn which was read in step 1704 or it can be another of the plurality of blocks in the plane. At step 1708, with the active bit lines of the plane being maintained at the first voltage VBL and with the inactive bit lines being maintained at the second voltage, the control circuitry performs a read operation on a selected word line WLn of the selected block. The process then returns to step 1706 and continues through the loop of steps 1706 and 1708 indefinitely without ramping down the bit lines from the elevated voltage VBL to approximately zero Volts.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A memory device, comprising:

a memory block that includes an array of memory cells arranged in a plurality of word lines and in a plurality of memory holes, the plurality of memory holes being in electrical communication with respective bit lines of a plurality of bit lines; and the plurality of bit lines including a plurality of active bit lines that are in electrical communication with active sense amplifiers and memory cells during read operations, and the plurality of bit lines including a plurality of inactive bit lines that are not in electrical communication with active sense amplifiers or memory cells during the read operations.

2. The memory device as set forth in claim 1, wherein the bit lines of the set of bit lines extend at least partially in parallel relationship with one another and wherein the active bit lines and inactive bit lines are arranged in alternating fashion.

3. The memory device as set forth in claim 1, wherein the inactive bit lines of the set of bit lines are electrically connected to a shared voltage source that holds the inactive bit lines at a constant voltage during the read operations.

4. The memory device as set forth in claim 1, wherein the memory block is a first memory block in a plane that includes a plurality of memory blocks that are in electrical communication with the set of bit lines, and wherein the plurality of memory blocks further includes a second memory block.

5. The memory device as set forth in claim 4, further including circuitry that is in communication with the plurality of memory blocks, the circuitry being configured to:

perform a first read operation on the first memory block while the active bit lines of the set of bit lines are held at a first voltage that is greater than zero Volts, and without ramping the active bit lines of the set of bit lines down from the first voltage, perform a second read operation on a second memory block of the plurality of memory blocks while the active bit lines of the set of bit lines are held at the first voltage.

6. The memory device as set forth in claim 5, wherein during and between the first and second read operations, the circuitry is configured to prevent the set of bit lines from falling by more than 25% from the first voltage.

7. The memory device as set forth in claim 6, wherein during and between the first and second read operations, the inactive bit lines are electrically connected to a shared voltage source that holds the inactive bit lines at a second voltage.

8. The memory device as set forth in claim 6, wherein during and between the first and second read operations, the inactive bit lines are electrically floating.

9. The memory device as set forth in claim 1, wherein at least half of the plurality of bit lines are inactive bit lines.

10. The memory device as set forth in claim 1, wherein at least half of the memory holes of the plurality of memory holes are inactive memory holes with memory cells that do not contain data.

11. A memory device, comprising:

a memory block that includes an array of memory cells arranged in a plurality of word lines and in a plurality of memory holes, the plurality of memory holes being in electrical communication with respective bit lines of a set of bit lines;

the set of bit lines including a plurality of active bit lines that are in electrical communication with active sense amplifiers and memory cells during read operations and that extend at least partially in parallel relationship with one another, and wherein adjacent ones of the plurality of active bit lines are spaced apart from one another by at least 30 nm;

wherein the memory block is a first memory block in a plane that includes a plurality of memory blocks that are in electrical communication with the set of bit lines, and wherein the plurality of memory blocks further includes a second memory block; and circuitry that is in communication with the plurality of memory blocks, the circuitry being configured to;

perform a first read operation on the first memory block while the active bit lines of the set of bit lines are held at a first voltage that is greater than zero Volts, and without ramping the active bit lines of the set of bit lines down from the first voltage, perform a second read operation on the second memory block of the plurality of memory blocks while the active bit lines of the set of bit lines are held at the first voltage.

12. The memory device as set forth in claim 11, wherein the set of bit lines further includes a plurality of inactive bit lines that are not in electrical communication with active sense amplifiers or memory cells during read operations, and wherein at least one inactive bit line of the plurality of inactive bit lines is disposed between each pair of adjacent active bit lines.

13. The memory device as set forth in claim 11, wherein during and between the first and second read operations, the circuitry is configured to prevent the set of bit lines from falling by more than 25% from the first voltage.

14. The memory device as set forth in claim 11, wherein at least half of the memory holes of the plurality of memory holes are inactive memory holes that do not contain data.

15. A computing system, comprising:

a processor unit;

a plurality of high bandwidth flash units, at least one of the high bandwidth flash units including;

a plurality of planes, at least one of the planes having a plurality of memory blocks that are in electrical communication with a set of bit lines, the memory blocks each including an array of memory cells that are arranged in a plurality of word lines and a plurality of memory holes, and a set of bit lines including a plurality of active bit lines that are in electrical communication with active sense amplifiers and memory cells during sensing operations, and the set of bit lines including a plurality of inactive bit lines that are not in electrical communication with active sense amplifiers or memory cells during read operations.

16. The computing system as set forth in claim 15, wherein the bit lines of the set of bit lines extend at least partially in parallel relationship with one another and wherein the active bit lines and inactive bit lines are arranged in alternating fashion.

17. The computing system as set forth in claim 15, wherein the inactive bit lines of the set of bit lines are electrically connected to a shared voltage source that holds the inactive bit lines at a second voltage during the read operations.

18. The computing system as set forth in claim 15, wherein the plurality of memory blocks includes a first memory block and a second memory block, and further including circuitry that is in communication with the plurality of memory blocks, the circuitry being configured to;

perform a first read operation on the first memory block while the active bit lines of the set of bit lines are held at a first voltage that is greater than zero Volts, and without ramping the active bit lines of the set of bit lines down from the first voltage, perform a second read operation on a second memory block of the plurality of memory blocks while the active bit lines of the set of bit lines are held at the first voltage.

19. The computing system as set forth in claim 18, wherein during and between the first and second read operations, the circuitry is configured to prevent the plurality of active bit lines from falling by more than 25% from the first voltage.

20. The computing system as set forth in claim 15, wherein at least half of the bit lines in the set of bit lines are inactive bit lines.

21. A method of performing a sensing operation in a memory device, comprising the steps of:

preparing a memory block that includes an array of memory cells arranged in a plurality of word lines and in a plurality of memory holes, the plurality of memory holes being in electrical communication with respective bit lines of a set of bit lines;

performing a read operation on a selected word line of the plurality of word lines using only a plurality of active bit lines of the set of bit lines while a plurality of inactive bit lines of the set of bit lines remain inactive; and wherein the read operation includes discharging a plurality of sense nodes through the plurality of active bit lines and through a plurality of active memory holes of the plurality of memory holes while the plurality of inactive bit lines of the set of bit lines and a plurality of inactive memory holes of the plurality of memory holes remain inactive.

22. The method as set forth in claim 21, wherein the bit lines of the set of bit lines extend at least partially in parallel relationship with one another and wherein the active bit lines and inactive bit lines are arranged in alternating fashion.

23. The method as set forth in claim 22, wherein the memory block is a first memory block of a plurality of memory blocks, wherein the step of performing the read operation includes performing a first read operation on the first memory block of the plurality of memory blocks while a plurality of bit lines are held at a first voltage that is greater than zero Volts; and further including the step of, without ramping the plurality of bit lines down from the first voltage, performing a second read operation on a second memory block of the plurality of memory blocks.

24. The method as set forth in claim 23, wherein during and between the first and second read operations, the plurality of active bit lines do not fall by more than 25% from the first voltage.

25. The method as set forth in claim 21, wherein the plurality of memory holes includes active memory holes with memory cells that contain data and inactive memory holes with memory cells that do not contain data, and wherein at least half of the memory holes of the plurality of memory holes are inactive memory holes.

26. A method of performing a sensing operation in a memory device, comprising the steps of:

preparing a memory block that includes an array of memory cells arranged in a plurality of word lines and in a plurality of memory holes, the plurality of memory holes being in electrical communication with respective bit lines of a set of bit lines, wherein the memory block is a first memory block of a plurality of memory blocks in a plane;

performing a first read operation on a selected word line of the plurality of word lines in the memory block using a plurality of active bit lines of the set of bit lines, the active bit lines extending at least partially in parallel relationship with one another, and adjacent ones of the active bit lines being spaced apart from one another by at least 30 nm;

wherein during the first read operation on the first memory block of the plurality of memory blocks, the plurality of active bit lines are held at a first voltage that is greater than zero Volts; and without ramping the plurality of active bit lines down from the first voltage, performing a second read operation on a second memory block of the plurality of memory blocks while the plurality of active bit lines are held at the first voltage.

27. The method as set forth in claim 26, wherein the active bit lines are in electrical communication with active sense amplifiers and memory cells during the read operation and wherein the set of bit lines further includes a plurality of inactive bit lines that are not in electrical communication with active sense amplifiers or memory cells during the read operation, and wherein at least one inactive bit line of the plurality of inactive bit lines is disposed between each pair of adjacent active bit lines.

28. The method as set forth in claim 27, wherein the read operation includes discharging a plurality of sense nodes through the plurality of active bit lines and through a plurality of active memory holes of the plurality of memory holes while the plurality of inactive bit lines of the set of bit lines and a plurality of inactive memory holes of the plurality of memory holes remain inactive.

29. The method as set forth in claim 26, wherein during and between the first and second read operations, the plurality of active bit lines do not fall by more than 25% from the first voltage.

30. The method as set forth in claim 26, wherein the plurality of memory holes includes active memory holes with memory cells that contain data and inactive memory holes with memory cells that do not contain data, and wherein at least half of the memory holes of the plurality of memory holes are inactive memory holes.

* * * * *